(12) United States Patent
Kounavis et al.

(10) Patent No.: US 10,223,528 B2
(45) Date of Patent: Mar. 5, 2019

(54) TECHNOLOGIES FOR DETERMINISTIC CODE FLOW INTEGRITY PROTECTION

(71) Applicant: Intel Corporation, Santa Clara, CA (US)

(72) Inventors: Michael E. Kounavis, Portland, OR (US); David M. Durham, Beaverton, OR (US); Ravi L. Sahita, Beaverton, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 15/276,895

(22) Filed: Sep. 27, 2016

(65) Prior Publication Data

US 2018/0089422 A1    Mar. 29, 2018

(51) Int. Cl.
*G06F 21/00* (2013.01)
*G06F 21/54* (2013.01)
*G06F 21/56* (2013.01)

(52) U.S. Cl.
CPC ............ *G06F 21/54* (2013.01); *G06F 21/563* (2013.01)

(58) Field of Classification Search
CPC ... G06F 21/54; G06F 21/563; G06F 2221/033
See application file for complete search history.

(56) References Cited

U.S. PATENT DOCUMENTS

| | | | |
|---|---|---|---|
| 9,639,703 B2 * | 5/2017 | Liu | G06F 21/577 |
| 2006/0047955 A1 | 3/2006 | Prevost et al. | |
| 2009/0320129 A1 | 12/2009 | Pan et al. | |
| 2010/0251221 A1 * | 9/2010 | Nori | G06F 11/3608 717/131 |
| 2013/0312102 A1 * | 11/2013 | Brake | G06F 21/577 726/25 |

(Continued)

FOREIGN PATENT DOCUMENTS

WO    2009067336    5/2009

OTHER PUBLICATIONS

International search report for PCT application No. PCT/US2017/047363, dated Nov. 28, 2017 (3 pages).

(Continued)

*Primary Examiner* — Mohammad A Siddiqi
(74) *Attorney, Agent, or Firm* — Barnes & Thornburg LLP

(57) ABSTRACT

Technologies for code flow integrity protection include a static analyzer that identifies a potential gadget in an atomic code path of a protected code. A marker instruction is inserted after the potential gadget with a parameter that corresponds to an address of the marker instruction, a hash evaluator instruction is inserted after an exit point of the atomic code path with a parameter that corresponds to the address of the marker instruction, and a compare evaluator instruction and a hash check instruction are inserted after the hash evaluator instruction. A target computing device executes the protected code and updates a path hash as a function of the parameter of the marker instruction, determines an expected hash value as a function of the parameter of the hash evaluator instruction, and generates an exception if the path hash and the expected hash value do not match. Other embodiments are described and claimed.

25 Claims, 6 Drawing Sheets

(56) References Cited

U.S. PATENT DOCUMENTS

| | | | |
|---|---|---|---|
| 2014/0068614 A1 | 3/2014 | Chen et al. | |
| 2015/0356294 A1 | 12/2015 | Tan et al. | |
| 2017/0295188 A1* | 10/2017 | David | H04L 63/0428 |
| 2018/0032735 A1* | 2/2018 | Sheth | G06F 21/577 |

OTHER PUBLICATIONS

Written opinion for PCT application No. PCT/US2017/047363, dated Nov. 28, 2017 (7 pages).

* cited by examiner

TECHNOLOGIES FOR DETERMINISTIC CODE FLOW INTEGRITY PROTECTION

BACKGROUND

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack. Jump-oriented programming (JOP) and call-oriented programming (COP) exploits are similar, but target gadgets that begin or end with an indirect jump instruction or a call instruction, respectively, rather than a return instruction.

Certain ROP exploits may be prevented by maintaining a "shadow stack" in parallel with the ordinary system stack (also called the "legacy stack"). The shadow stack maintains a copy of the legacy stack in memory inaccessible to ordinary software, and may be used to determine if the legacy stack has been tampered with by malware. Other measures available to help prevent ROP, JOP, or other control flow exploits may include inserting ENDBRANCH instructions into binaries to specifically mark allowed targets for indirect branches or jumps.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
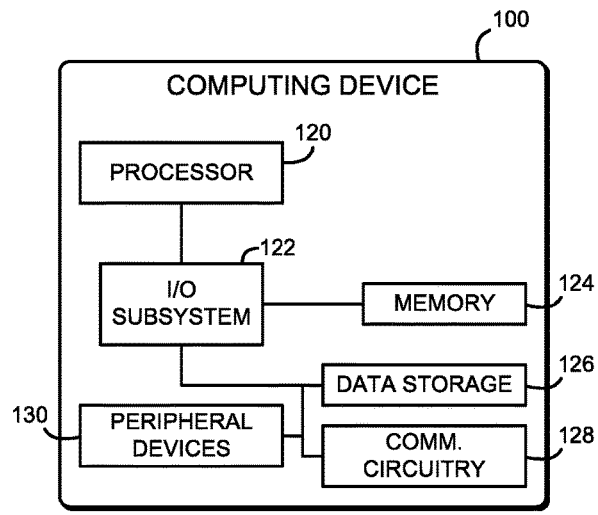
FIG. 1 is a simplified block diagram of at least one embodiment of a computing device for code flow integrity protection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 may be used for code flow integrity protection. In use, as described further below, a compiler computing device 100a may statically analyze and instrument protected code, and a target computing device 100b may execute the instrumented code. The compiler computing device 100a identifies one or more atomic code paths within the protected code and inserts marker instructions following each potential gadget in the atomic code path. The compiler computing device 100a inserts code at every exit point from an atomic code path to verify that each of the marker instructions of a valid atomic code path was executed. In use, the target computing device 100b executes the atomic code path including the marker instructions. Each marker instruction causes the target computing device 100b to update a path hash register based on the offset of the current marker instruction. Upon exiting the atomic code path, the target computing device 100b determines whether the current path hash register matches the expected hash value for any atomic code path for that exit point. Thus, the computing device 100 may allow for deterministic protection against code flow exploits such as call-oriented programming, return-oriented programming, or jump-oriented programming attacks. Such protection is provided even for calls made across different statically linked packages (e.g., DLLs). Additionally, the computing device 100 may provide control flow integrity protection with reasonable cost in terms of performance and/or required processor hardware. Although described as compiling and instrumenting the protected code with a compiler computing device 100a and executing the protected code with a target computing device 100b, it should be understood that in some embodiments the same computing device 100 may analyze, instrument, and execute the protected code.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
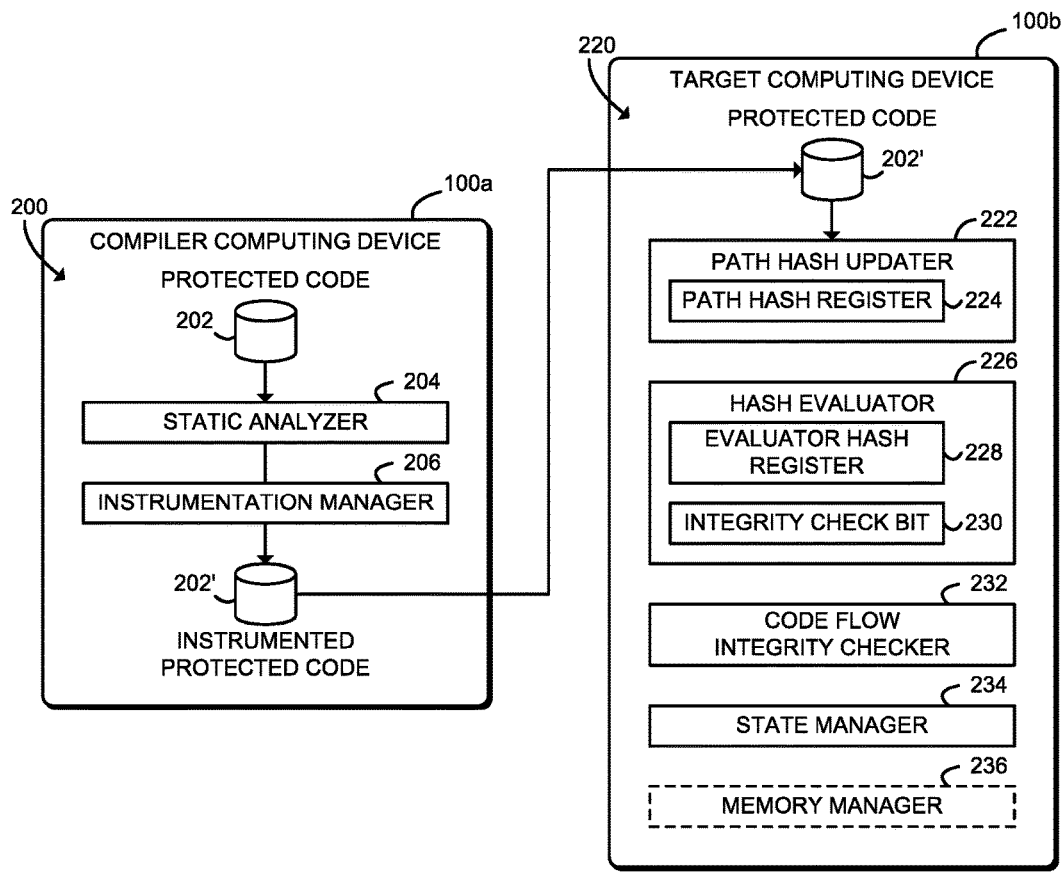
FIG. 2 is a simplified block diagram of various environments that may be established by one or more computing devices of FIG. 1.

Referring now to FIG. 2, in an illustrative embodiment, the compiler computing device 100a establishes an environment 200 during operation. The illustrative environment 200 includes a static analyzer 204 and an instrumentation manager 206. The various components of the environment 200 may be embodied as hardware, firmware, software, or a combination thereof. As such, in some embodiments, one or more of the components of the environment 200 may be embodied as circuitry or collection of electrical devices (e.g., static analyzer circuitry 204 and/or instrumentation manager circuitry 206). It should be appreciated that, in such embodiments, one or more of the static analyzer circuitry 204 and/or the instrumentation manager circuitry 206 may form a portion of one or more of the processor 120, the I/O subsystem 122, and/or other components of the compiler computing device 100a. Additionally, in some embodiments, one or more of the illustrative components may form a portion of another component and/or one or more of the illustrative components may be independent of one another.

The static analyzer 204 is configured to identify atomic code paths of a protected code 202. The protected code 202 may be embodied as any binary code, bytecode, intermediate representation, or other code that may be executed by or further compiled to be executed by the processor 120 of the target computing device 100b. An atomic code path may be embodied as, for example, a code path that contains no subroutine calls and returns, no jumps apart from the jumps of if-then-else and case statements, and no loops including for, while, and do-while loops. Each atomic code path includes an entry point and an exit point, and may be embodied as a sequence of code without a subroutine call, a subroutine return, a loop entry, or a jump other than an if statement jump or a case statement jump. The static analyzer 204 is further configured to identify potential gadgets in each atomic code path. Potential gadgets may include return-oriented programming gadgets, jump-oriented programming gadgets, or external dynamic linked library (DLL) calls. In some embodiments, the static analyzer 204 may be configured to identify a non-return jump of the protected code 202 that jumps to the entry point of an atomic code path.

The instrumentation manager 206 instruments the protected code 202, generating the instrumented protected code 202'. The instrumentation manager 206 is configured to insert marker instructions in each atomic code path in proximity to each potential gadget (e.g., immediately before or immediately after each gadget), with each marker instruction having a parameter that corresponds to an address of the marker instruction. In some embodiments, the instrumentation manager 206 is further configured to insert a marker instruction in the protected code 202 before a non-return jump with a parameter that corresponds to an address of the marker instruction. The instrumentation manager 206 is further configured to insert one or more control flow integrity evaluation instructions in the protected code 202 after the exit point of the atomic code path. The control flow integrity evaluation instructions may include hash evaluator instructions, compare evaluator instructions, and hash check instructions. The instrumentation manager 206 may be configured to insert hash evaluator instructions in the protected code 202 after the exit point of an atomic code path, with each hash evaluator instruction having a parameter that corresponds to the address of a corresponding marker instruction, to insert a compare evaluator instruction in the protected code 202 after each group of hash evaluator instructions, and insert a hash check instruction in the protected code 202 after the last inserted compare evaluator instruction for each exit point. The instrumentation manager 206 may be configured to insert a push instruction in the protected code 202 at each entry point of an atomic code path and to insert a pop instruction in the protected code 202 after the hash check instruction for each exit point.

Still referring to FIG. 2, in the illustrative embodiment, the target computing device 100b establishes an environment 220 during operation. The illustrative environment 220 includes a path hash updater 222, a hash evaluator 226, a code flow integrity checker 232, a state manager 234, and in some embodiments a memory manager 236. The various components of the environment 220 may be embodied as hardware, firmware, software, or a combination thereof. As such, in some embodiments, one or more of the components of the environment 220 may be embodied as circuitry or collection of electrical devices (e.g., path hash updater circuitry 222, hash evaluator circuitry 226, code flow integrity checker circuitry 232, state manager circuitry 234, and/or memory manager circuitry 236). It should be appreciated that, in such embodiments, one or more of the path hash updater circuitry 222, the hash evaluator circuitry 226, the code flow integrity checker circuitry 232, the state manager circuitry 234, and/or the memory manager circuitry 236 may form a portion of one or more of the processor 120, the I/O subsystem 122, and/or other components of the target computing device 100b. Additionally, in some embodiments, one or more of the illustrative components may form a portion of another component and/or one or more of the illustrative components may be independent of one another.

The path hash updater 222 is configured to execute atomic code paths of the protected code 202'. Each atomic code path includes an entry point, an exit point, and one or more marker instructions. The path hash updater 222 is configured to update a path hash as a function of an address of a marker instruction in response to executing the atomic code path. As shown, the computing device 100b further includes a path hash register 224, and updating the path hash may include storing the path hash in the path hash register 224. The path hash register 224 may be embodied as an internal register of the processor 120, and may be saved and restored as part of a process control block of a process. The path hash may be updated by executing, with the processor 120, the marker instructions of the atomic code path, with each marker instruction having a parameter that corresponds to the address of that marker instruction. The path hash updater 222 may reach the exit point of an atomic code path when executing the atomic code path.

The hash evaluator 226 is configured to generate, in response to reaching the exit point, an expected hash value as a function of one or more addresses corresponding to the marker instructions of a valid atomic code path ending at the exit point. As shown, the computing device 100b further includes an evaluator hash register 228, and generating the expected hash value may include storing the expected hash value in the evaluator hash register 228. The evaluator hash register 228 may be embodied as an internal register of the processor 120, and may be saved and restored as part of a process control block of a process. Each expected hash value may be generated by executing, by the processor 120, a group of one or more hash evaluator instructions, with each hash evaluator instruction of the group corresponding to a marker instruction of a valid atomic code path ending at the exit point. The hash evaluator 226 is further configured to determine whether the path hash matches the expected hash value. As shown, the computing device 100b further comprises an integrity check bit 230. The integrity check bit 230 may be embodied as an internal register of the processor 120, and may be saved and restored as part of a process control block of a process. To determine whether the path hash matches the expected hash value may include setting the integrity check bit 230 in response to determining that the path hash matches the expected hash. Determining whether the path hash matches the expected hash value may include executing, by the processor 120, a compare evaluator instruction.

The code flow integrity checker 232 is configured to generate a code flow integrity exception in response to determining that the path hash does not match the expected hash value. Generating the code flow integrity exception may include executing, by the processor 120, a hash check instruction.

The state manager 234 is configured to save a previous path hash in a secure storage location of the computing device 100b and restore the previous path hash from the secure storage location if the path hash matches the expected hash value. The previous path has may be saved prior to executing an atomic code path. Saving the previous path hash may include executing, by the processor 120, a push instruction to store the previous path hash in a secure stack, and restoring the previous path hash may include executing, by the processor 120, a pop instruction to retrieve the previous path hash from the secure stack.

The memory manager 236 is configured to perform an encrypted memory access with the path hash as a parameter during execution of an atomic code path. In other words, the value of the path hash as updated in response to execution of various marker instructions may be used to perform the encrypted memory access.

Although illustrated as being established by a separate compiler computing device 100a and target computing device 100b, it should be understood that in some embodiments some or all of the environments 200, 220 may be established by the same computing device 100. For example, in some embodiments the protected code 202 may be instrumented and executed by the same computing device 100.

Figure 3:
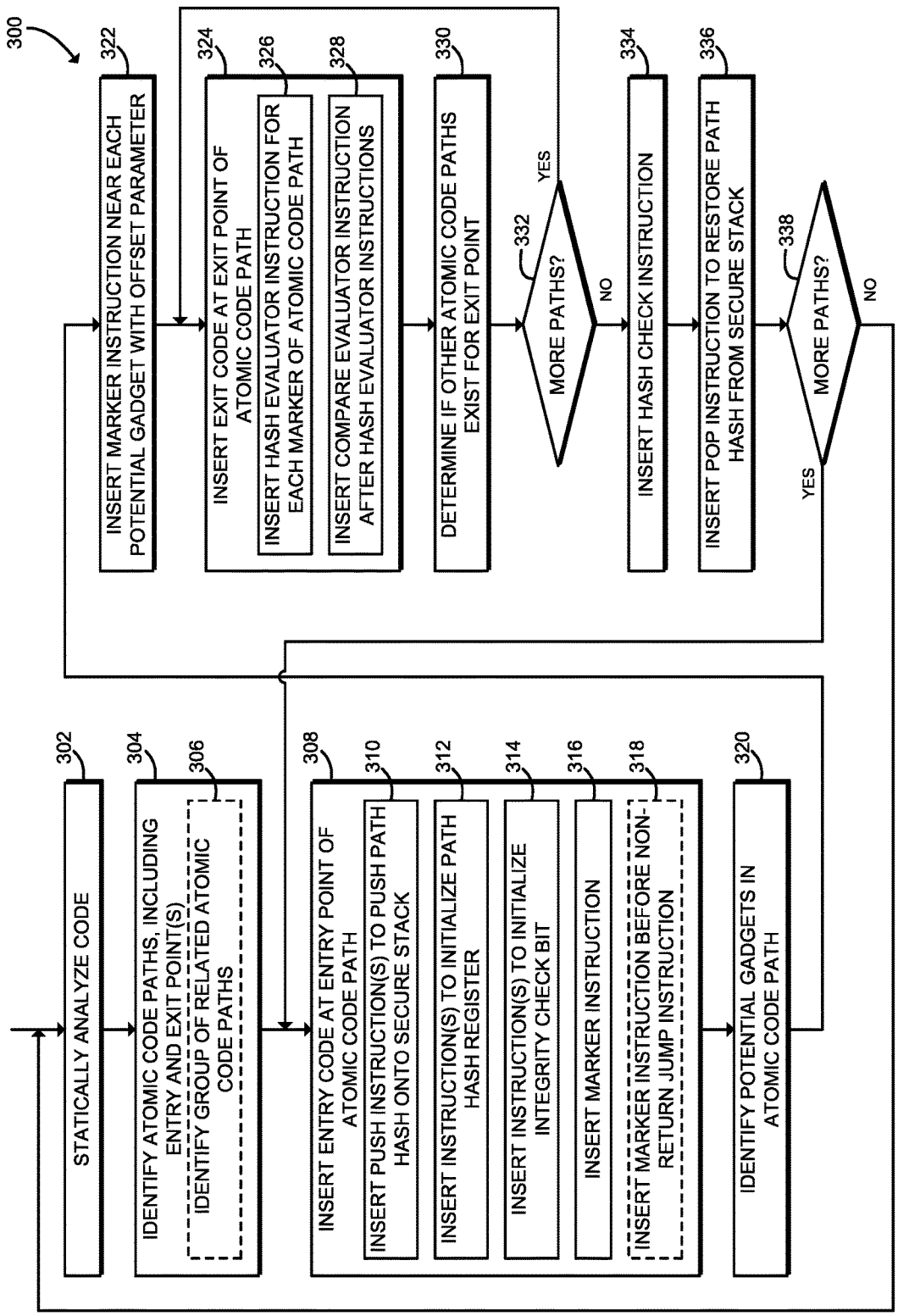
FIG. 3 is a simplified flow diagram of at least one embodiment of a method for statically analyzing and instrumenting code that may be executed by a computing device of FIGS. 1-2.

Referring now to FIG. 3, in use, the compiler computing device 100a may execute a method 300 for statically analyzing and instrumenting code. It should be appreciated that, in some embodiments, the operations of the method 300 may be performed by one or more modules of the environment 200 of the compiler computing device 100a as shown in FIG. 2. Additionally or alternatively, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 124, the data storage device 126, other memory or data storage devices of the computing device 100, portable media readable by a peripheral device of the computing device 100, and/or other media.

The method 300 begins in block 302, in which the compiler computing device 100a statically analyzes the protected code 202. The protected code 202 may be embodied as source code, object code, executable code, bytecode, or any other computer code that may be executed by the target computing device 100b. As described above, the static analysis may be performed by a compiler, a linker, and/or a standalone static analysis tool. The compiler computing device 100a may analyze and instrument the protected code 202 during static analysis, as described further below. As the compiler computing device 100a instruments the protected code 202, one or more instructions may be inserted into the instrumented protected code 202'.

In block 304, the compiler computing device 100a identifies one or more atomic code paths within the protected code 202. An atomic code path may be embodied as a contiguous segment of code that does not include any subroutine calls or returns, does not include any jumps other than jumps of if-then-else statements or case statements, and does not include any loops (e.g., for loops, while loops, do-while loops, etc.). As described further below, run-time processing of an atomic code path may be interrupted by subroutine calls, certain jumps, or loops, and processing of the atomic code may resume upon return from the interruption. Each atomic code path includes an entry point and an exit point. Certain atomic code paths may branch to multiple exit points, and each exit point may be reachable from multiple atomic code paths. In some embodiments, in block 306, the compiler computing device 100a may identify a group of multiple related atomic code paths. The atomic code paths within a group may overlap execution, share entry points or exit points, or otherwise be related.

Figure 4:
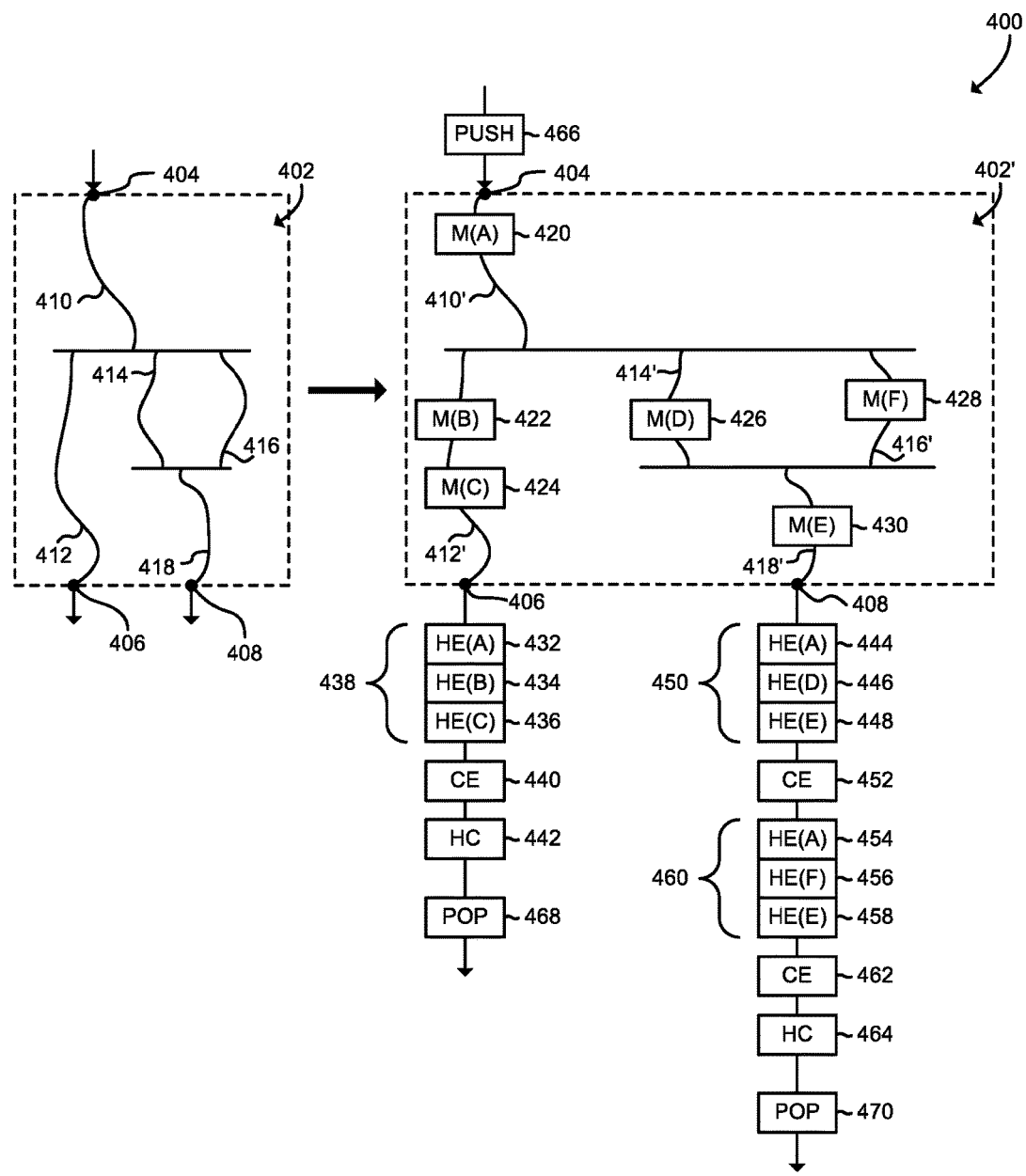
FIG. 4 is a simplified flow diagram of at least one embodiment of atomic code paths that are instrumented for code flow integrity protection.

Referring now to FIG. 4, schematic diagram 400 illustrates one potential embodiment of an atomic code path group 402. As shown, the atomic code path group 402 includes a single entry point 404 and two exit points 406, 408. The atomic code path group 402 further includes multiple code path segments 410, 412, 414, 416, 418. As shown, the entry point 404 leads to the code path segment 410, which branches to the code segments 412, 414, 416. The code path segment 412 leads to the exit point 406. The code path segments 414, 416 join to the code path segment 418, which leads to the exit point 408. Thus, the atomic code path group 402 includes at least three atomic code paths: a path including the code path segments 410, 412, a path including the code path segments 410, 414, 418, and a path including the code path segments 410, 416, 418.

Referring back to FIG. 3, after identifying the atomic code paths in block 304, in block 308 the compiler computing device 100a inserts entry code at the entry point of an atomic code path. As described further below in connection with FIGS. 5A and 5B, at runtime the entry code is executed by the target computing device 100b to prepare for control flow integrity checking. In block 310, the compiler computing device 100a inserts one or more push instructions to push the path hash register 224 of the target computing device 100b to a secure stack. The secure stack may be embodied as any secure memory location of the target computing device 100b that is protected from unauthorized access and/or modification. For example, the secure stack may be embodied as an encrypted memory page or as a register file of the processor 120. In block 312, the compiler computing device 100a inserts one or more instructions to initialize the path hash register 224 of the target computing device 100b. The instructions may clear the path hash register 224, set the path hash register 224 to a default value such as zero, or otherwise prepare the path hash register 224 to perform control flow protection. In block 314, the compiler computing device 100a inserts one or more instructions to initialize the integrity check bit 230 of the target computing device 100b. The instructions may clear the integrity check bit 230, set the integrity check bit 230 to a default value such as zero, or otherwise prepare the integrity check bit 230 to perform control flow protection. In block 316, the compiler computing device 100a inserts a marker instruction at the entry point of the atomic code path. The marker instruction may be inserted at the address of the entry point or near the entry point such that the marker instruction is executed when the atomic code path is entered. The compiler computing device 100a may include the offset of the marker instruction as a parameter to the marker instruction. As described further below, during execution the marker instruction at runtime updates the path hash register 224 based on the supplied offset of the marker instruction.

In some embodiments, in block 318 the compiler computing device 100a may insert a marker instruction before a non-returning jump instruction that jumps to the entry point of the atomic code path. Similarly, the compiler computing device 100a may include the offset of the marker instruction as a parameter to the marker instruction. Executing the marker instruction before the non-returning jump effectively includes the jump in the control flow of the atomic code path, and thus allows the code flow integrity of the non-return jump and the atomic code path to be checked.

In block 320, the compiler computing device 100a identifies one or more potential gadgets in the atomic code path. Each gadget may be embodied as a sequence of instructions ending in a binary string that could be used in a code flow exploit. For example, gadgets ending in the equivalent of a return instruction or a jump instruction may be used in return-oriented programming (ROP) or jump-oriented programming (JOP) exploits, respectively. For certain processor architectures, such as the Intel® 64 and IA-32 architectures, instructions may have variable length and thus the gadgets need not be aligned with instruction boundaries of the atomic code path.

In block 322, the compiler computing device 100a inserts a marker instruction in proximity to each potential gadget in the atomic code path. In one embodiment, a marker instruction may be placed before a potential gadget in the atomic code path. In another embodiment, a marker instruction may be placed after a potential gadget in the atomic code path. The marker instruction may be inserted in the instrumented protected code 202' at the instruction boundary immediately preceding or following the gadget. Thus, if the gadget were executed as part of an exploit, the marker instruction may not be executed. Additionally or alternatively, if the gadget were executed as part of an exploit, the marker instruction may be executed in the wrong order. The compiler computing device 100*a* includes the offset of the marker instruction as a parameter to the marker instruction. As described further below, during execution the marker instruction updates the path hash register 224 based on the supplied offset of the marker instruction.

In block 324, the compiler computing device 100*a* inserts exit code at the exit point of the atomic code path. As described further below in connection with FIGS. 5A and 5B, at runtime the exit code is executed by the target computing device 100*b* to determine whether a valid atomic code path to the exit point has been executed and thereby check code flow integrity. The exit code may be inserted in the instrumented protected code 202' immediately following the exit point.

In block 326, the compiler computing device 100*a* inserts a hash evaluator instruction for each marker instruction of the atomic code path ending at the exit point. Each hash evaluator instruction includes a parameter equal to the offset of the corresponding marker instruction. The hash evaluator instructions are inserted in the same order as the corresponding marker instructions. At runtime, executing each hash evaluator instruction causes the target computing device 100*b* to update the evaluator hash register 228. Because the hash evaluator instructions have the same parameters and same ordering as the marker instructions of a valid atomic code path, the final value of the evaluator hash register 228 matches the expected value of the path hash register 224 for that valid atomic code path. Since the valid atomic code paths and potential gadgets are identified statically, the hash evaluator instructions and associated parameters may also be included statically in the instrumented protected code 202'.

In block 328, the compiler computing device 100*a* inserts a compare evaluator instruction after the hash evaluator instruction(s). At runtime, executing the compare evaluator instruction causes the target computing device 100*b* to compare the values of the path hash register 224 and the evaluator hash register 228. If those values match, then the target computing device 100*b* may set the integrity check bit 230, for example using a logical OR operation. If the values do not match, then the target computing device 100*b* may not change the value of the integrity check bit 230. If the path hash register 224 matches the evaluator hash register 228, this indicates that the target computing device 100*b* has executed all marker instructions of the atomic code path in the correct order, indicating that the atomic code path was properly executed.

In block 330, the compiler computing device 100*a* determines if other atomic code paths exist for the current exit point. For example, the compiler computing device 100*a* may examine a group of related atomic code paths to find additional atomic code paths ending at the current exit point. In block 332, the compiler computing device 100*a* checks whether additional atomic code paths remain. If so, the method 300 loops back to block 324, in which the compiler computing device 100*a* inserts hash evaluator instructions and a compare evaluator instruction for the additional atomic code paths. If no more atomic code paths exist for the current exit point, the method 300 advances to block 334.

In block 334, the compiler computing device 100*a* inserts a hash check instruction. The hash check instruction causes the target computing device 100*b* to determine whether any of the compare evaluator instructions found a match between the path hash register 224 and the evaluator hash register 228 and, if not, generate a code flow integrity fault, exception, interrupt, or otherwise indicate that a code flow integrity violation has occurred. For example, the hash check instruction may determine whether the integrity check bit 230 is set and, if not, generate a code flow integrity exception.

In block 336, the compiler computing device 100*a* inserts a pop instruction to cause the target computing device 100*b* to restore a saved value of the path hash register 224 from the secure stack. As described above, the path hash register 224 value may have been pushed to the secure stack when entering the atomic code path. Restoring the path hash register 224 may allow the target computing device 100*b* to continue checking control flow integrity of an atomic code path that was interrupted, for example by a subroutine call or a loop.

In block 338, the compiler computing device 100*a* determines whether additional atomic code paths exist in the protected code 202. If so, the method 300 loops back to block 308 to insert entry code, marker instructions, and exit code, and to otherwise generate the instrumented protected code 202'. If no further atomic code paths exist, the method 300 loops back to block 302, in which the compiler computing device 100*a* may process additional protected code 202.

Referring again to FIG. 4, as described above, the diagram 400 illustrates an atomic code path group 402 that may be analyzed and instrumented by the compiler computing device 100*a*. The diagram 400 also illustrates an instrumented atomic code path group 402' that may be output by the compiler computing device 100*a*. The instrumented atomic code path group 402' includes instrumented code path segments 410', 412', 414', 416', 418', which have been instrumented by inserting marker instructions after each potential gadget. Instrumented code path segment 410' includes marker instruction 420, instrumented code path segment 412' includes marker instructions 422, 424, instrumented code path segment 414' includes marker instruction 426, instrumented code path segment 416' includes marker instruction 428, and instrumented code path segment 418' includes marker instruction 430. Each marker instruction includes a parameter equal to the in-memory offset of that marker instruction. For example, marker instruction 420 is at offset A, marker instruction 422 is at offset B, and so on, as shown in FIG. 4.

As further shown in FIG. 4, exit code has been inserted after the exit points 406, 408. Hash evaluator instructions 432, 434, 436 follow exit point 406. The hash evaluator instructions 432, 434, 436 form a group 438 that corresponds to the atomic code path 410', 412'. Thus, the parameter A of the hash evaluator instruction 432 matches the offset A of the marker instruction 420, the parameter B of the hash evaluator instruction 434 matches the offset B of the marker instruction 422, and the parameter C of the hash evaluator instruction 436 matches the offset C of the marker instruction 424. A compare evaluator instruction 440 follows the group 438, and a hash check instruction 442 follows the compare evaluator instruction 442.

Similarly, hash evaluator instructions 444, 446, 448 follow exit point 408. The hash evaluator instructions 444, 446, 448 form a group 450 that corresponds to the atomic code path 410', 414', 418'. Thus, the parameter A of the hash evaluator instruction 444 matches the offset A of the marker instruction 420, the parameter D of the hash evaluator instruction 446 matches the offset D of the marker instruction 426, and the parameter E of the hash evaluator instruction 448 matches the offset E of the marker instruction 430. A compare evaluator instruction 452 follows the group 450.

Because exit point 408 has two potentially valid atomic code paths, hash evaluator instructions 454, 456, 458 follow the compare evaluator instruction 452. The hash evaluator instructions 454, 456, 458 form a group 460 that corresponds to the atomic code path 410', 416', 418'. Thus, the parameter A of the hash evaluator instruction 454 matches the offset A of the marker instruction 420, the parameter F of the hash evaluator instruction 456 matches the offset F of the marker instruction 428, and the parameter E of the hash evaluator instruction 458 matches the offset E of the marker instruction 430. A compare evaluator instruction 462 follows the group 460, and a hash check instruction 464 follows the compare evaluator instruction 462.

As shown in FIG. 4, a push instruction 466 may be inserted before the entry point 404, and pop instructions 468, 470 may be inserted after each of the hash check instructions 442, 464, respectively. It should be noted that the push and pop instructions that operate on path hash values may be different from regular processor push and pop instructions that operate on general purpose register content. In one embodiment, push and pop instructions operating on path hash values may insert path hash values into or extract path hash values from a protected memory area.

Figure 5A:
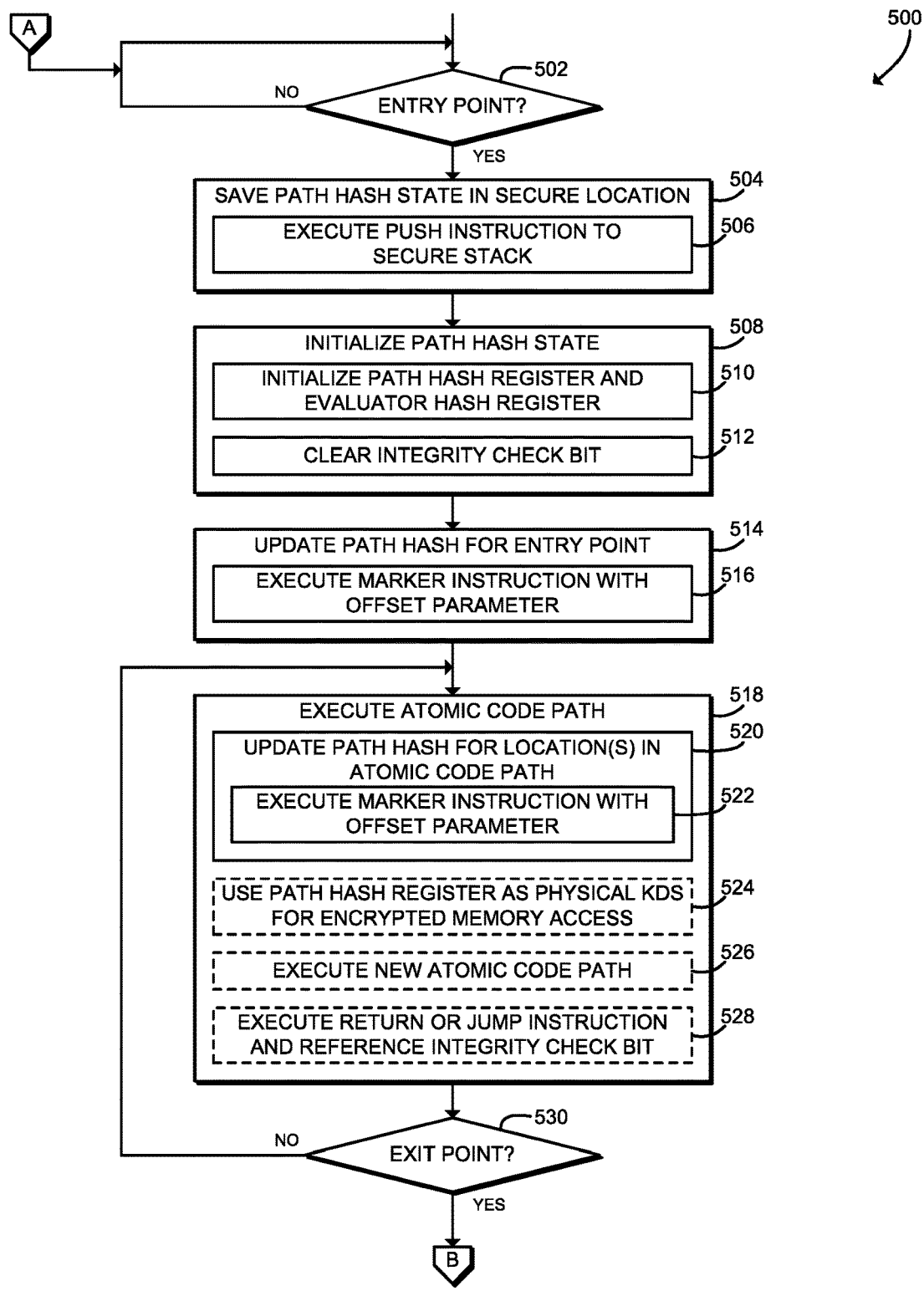
FIGS. 5A and 5B are a simplified flow diagram of at least one embodiment of a method for code flow integrity protection that may be executed by a computing device of FIGS. 1-2.
Figure 5B:
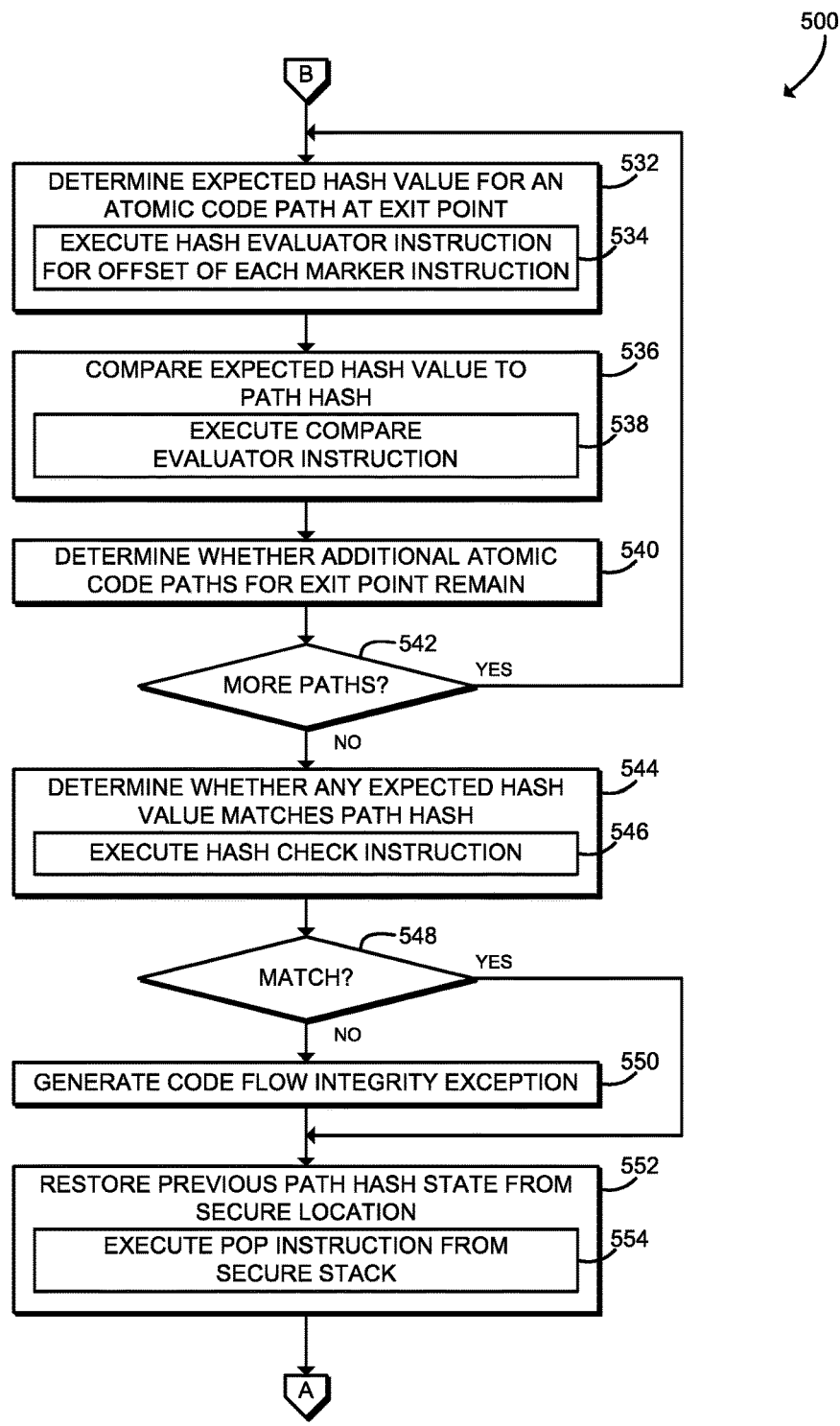

Referring now to FIGS. 5A and 5B, in use, the target computing device 100b may execute a method 500 for code flow integrity protection. It should be appreciated that, in some embodiments, the operations of the method 500 may be performed by one or more modules of the environment 220 of the target computing device 100b as shown in FIG. 2. Additionally or alternatively, in some embodiments, the method 500 may be embodied as various instructions stored on a computer-readable media, which may be executed by the processor 120 and/or other components of the computing device 100 to cause the computing device 100 to perform the method 500. The computer-readable media may be embodied as any type of media capable of being read by the computing device 100 including, but not limited to, the memory 124, the data storage device 126, other memory or data storage devices of the computing device 100, portable media readable by a peripheral device of the computing device 100, and/or other media.

The method 500 may be executed by the target computing device 100b during execution of instrumented protected code 202'. As described above in connection with the method of FIG. 3, the compiler computing device 100a may statically analyze the protected code 202 to generate the instrumented protected code 202'. The target computing device 100b may receive the instrumented protected code 202' via a network connection or may otherwise be provisioned with the instrumented protected code 202'. Of course, as described above, in some embodiments the instrumented protected code 202' may be instrumented and executed by the same computing device 100.

The method 500 begins in block 502, in which the target computing device 100b determines whether an entry point of an atomic code path has been reached. An atomic code path entry point may be reached, for example, when beginning to execute the atomic code path or when interrupting another atomic code path to execute the atomic code path. As described above in connection with FIG. 3, the entry point of the atomic code path may be identified during static analysis of the protected code 202, and thus the determination of whether an entry point has been reached may be encoded statically in the protected code 202'. If an entry point has not been reached, the method 500 loops back to block 502 to continue monitoring for entry points. If an entry point has been reached, the method 500 advances to block 504.

In block 504, the target computing device 100b saves the current path hash state in a secure storage location. For example, the target computing device 100b may save the current state of the path hash register 224. Saving the current path hash state may allow the target computing device 100b to interrupt code flow integrity checking for a current atomic code path and perform code flow integrity checking for the new atomic code path. In block 506, the target computing device 100b executes a push instruction to store the contents of the path hash register 224 to a secure stack. As described above, the secure stack may be embodied as any secure memory location that is protected from unauthorized access and/or modification, such as an encrypted memory page or a register file of the processor 120. The secure stack may support a relatively small number of entries (e.g., 16, 32, or 128) and thus may be realized using in-processor dedicated register files.

In block 508, the target computing device 100b initializes the path hash state to prepare for control flow integrity checking for the new atomic code path. In block 510, the target computing device 100b initializes the path hash register 224 and the evaluator hash register 228. The target computing device 100b may, for example, clear the registers 224, 228, set the registers 224, 228 to a default value such as zero, or otherwise prepare the registers 224, 228 to perform control flow protection. In block 512, the target computing device 100b clears the integrity check bit 230, for example by setting the integrity check bit 230 to zero.

In block 514, the target computing device 100b updates the path hash register 224 based on the address of the entry point. Updating the path hash register 224 based on the address of the entry point indicates that the target computing device 100b has executed code at the entry point. For example, the target computing device 100b may set the path hash register 224 to the hash of the previous value of the path hash register 224 with the offset of the entry point. In block 516, to update the path hash register 224, the target computing device 100b executes a marker instruction with an offset parameter that equals the offset of the entry point. When executing the marker instruction, the processor 120 updates the path hash register 224 using the supplied parameter.

In block 518, the target computing device 100b executes code of the atomic code path. The target computing device 100b may execute the original code of the protected code 202 (e.g., application code) as well as instrumentation inserted in the instrumented protected code 202'. In block 520, the target computing device 100b updates the path hash register 224 based on the address of marker instructions included at various locations in the atomic code path. For example, the target computing device 100b may set the path hash register 224 to the hash of the previous value of the path hash register 224 with the offset of a marker instruction in the atomic code path. As described above in connection with FIG. 3, those marker instructions may follow potential gadgets found in the atomic code path. Updating the path hash register 224 based on the address following a gadget indicates that the target computing device 100b has executed code following the gadget, which in turn indicates that the gadget was not executed as part of an exploit. In block 522, to update the path hash register 224, the target computing device 100b executes a marker instruction with an offset parameter that equals the offset of the marker instruction.

When executing the marker instruction, the processor 120 updates the path hash register 224 using the supplied parameter.

In some embodiments, in block 524, the target computing device 100b may use the contents of the path hash register 224 as key domain selectors for an encrypted memory access. The hash value associated with a valid code path (i.e., the contents of the path hash register 224) may be used by memory access instructions in order to translate application-specific memory entry coordinates visible in the linear address space and application code (i.e., linear key domain selectors) to secret physical mappings of these coordinates known only to the instruction set architecture and processor 120 (i.e., physical key domain selectors). The physical key domain selectors may be used as tweak values for accessing encrypted memory regions in a secure way. Code that does not follow a valid atomic code path (such as malware executing gadgets or other exploit code) may use the correct linear key domain selectors to access sensitive memory regions; however the physical key domain selectors are determined based on the path hash register 224 and thus will be incorrect. Accessing the encrypted memory regions using the incorrect physical key domain selectors (i.e., the wrong value for the path hash register 224) may cause the encrypted memory regions to be decrypted to random plaintext.

In block 526, in some embodiments the target computing device 100b may execute a new atomic code path from within the atomic code path. For example, the target computing device 100b may execute a subroutine call or may enter a loop body. In response to executing the new atomic code path, the target computing device 100b may execute another instance of the method 500, starting with the block 502. In other words, when the atomic code path is interrupted, the current path hash state may be saved and the new atomic code path may be executed. After the new atomic code path is completed, for example by returning from the subroutine or exiting the loop, execution of the previous atomic code path may be resumed. In some embodiments, in block 528 the target computing device 100b may execute a return or a jump instruction, for example in response to an exploit causing the target computing device 100b to execute a misaligned return or jump instruction. The return or the jump instruction executed by the computing device 100b checks if the control flow integrity bit is set. If not, the target computing device 100b may generate a code flow integrity exception as described below in connection with block 550 of FIG. 5B.

In block 530, the target computing device 100b determines whether an exit point has been reached for the current atomic code path. An atomic code path exit point may be reached, for example, when returning from a subroutine, exiting a loop, or otherwise ending execution of an atomic code path. As described above in connection with FIG. 3, the exit point of the atomic code path may be identified during static analysis of the protected code 202, and thus the determination of whether an exit point has been reached may be encoded statically in the instrumented protected code 202'. If an exit point has not been reached, the method 500 loops back to block 518 to continue executing the atomic code path. If an exit point has been reached, the method 500 advances to block 532, shown in FIG. 5B.

In block 532, the target computing device 100b determines an expected hash value for an atomic code path that ends at the current exit point. The target computing device 100b may calculate the expected hash value by updating the evaluator hash register 228 based on the offsets of all marker instructions included in a particular atomic code path that ends at the current exit point. The evaluator hash register 228 is updated in the same order as the marker instructions would be executed in the atomic code path. In block 534, to generate the expected hash value, the target computing device 100b executes a hash evaluator instruction for each marker instruction of the atomic code path. Each hash evaluator instruction is supplied with a parameter equal to the offset of the corresponding marker instruction.

In block 536, the target computing device 100b compares the expected hash value to the current path hash. The target computing device 100b may compare the values of the path hash register 224 and the evaluator hash register 228 to determine whether those values match. The path hash register 224 matching the evaluator hash register 228 indicates that the target computing device 100b has executed all marker instructions of the atomic code path in the correct order, which indicates that the atomic code path was correctly executed. If the path hash register 224 and the evaluator hash register 228 match, then the target computing device 100b may set the integrity check bit 230, and if those values do not match, then the target computing device 100b may not change the value of the integrity check bit 230. For example, the target computing device 100b may perform a logical OR operation with the previous value of the integrity check bit 230 and the result of comparison between the registers 224, 228. In block 538, to compare the registers 224, 228 the target computing device 100b executes a compare evaluator instruction.

In block 540, the target computing device 100b determines whether additional atomic code paths exist for the current exit point. As described above in connection with FIG. 3, all of the atomic code paths and exit points may be identified statically in the protected code 202. Thus the determination of whether additional atomic code paths remain may also be encoded statically in the instrumented protected code 202'. In block 542, the target computing device 100b checks whether additional atomic code paths remain If so, the method 500 loops back to block 532 to calculate and compare additional expected hash values. If no additional atomic code paths remain, the method 500 advances to block 544.

In block 544, the target computing device 100b determines whether any of the expected hash values matches the path hash; that is, the target computing device 100b determines whether any of the compare evaluator instructions indicated a match. The target computing device 100b may determine whether a match was found by determining whether the compare integrity check bit 230 was set. In block 546, to determine whether any of the expected hash values matches the path hash, the target computing device 100b executes a hash check instruction. In block 548, the target computing device 100b checks whether a match was found. If so, the method 500 branches ahead to block 552, described below. If not, the method 500 advances to block 550, in which the target computing device 100b generates a code flow integrity exception. The target computing device 100b may generate a code flow integrity fault, exception, interrupt, or otherwise indicate that a code flow integrity violation has occurred. In some embodiments, the target computing device 100b may perform one or more security responses based on the code flow integrity exception, such as terminating the instrumented protected code 202', reporting the violation, or other appropriate security response. After generating the code flow integrity exception, the method 500 may advance to block 552.

In block 552, the target computing device 100b retrieves the previous path hash state from the secure storage location. For example, the target computing device 100b may restore the previous state of the path hash register 224. Restoring the previous path hash state may allow the target computing device 100b to resume code flow integrity checking for a previously interrupted atomic code path. In block 554, the target computing device 100b executes a pop instruction to retrieve the previous path hash value from the secure stack and store that value in the path hash register 224. After restoring the previous path hash state, the method 500 loops back to block 502, shown in FIG. 5A, to continue control flow integrity checking for additional atomic code paths.

Figure 6:
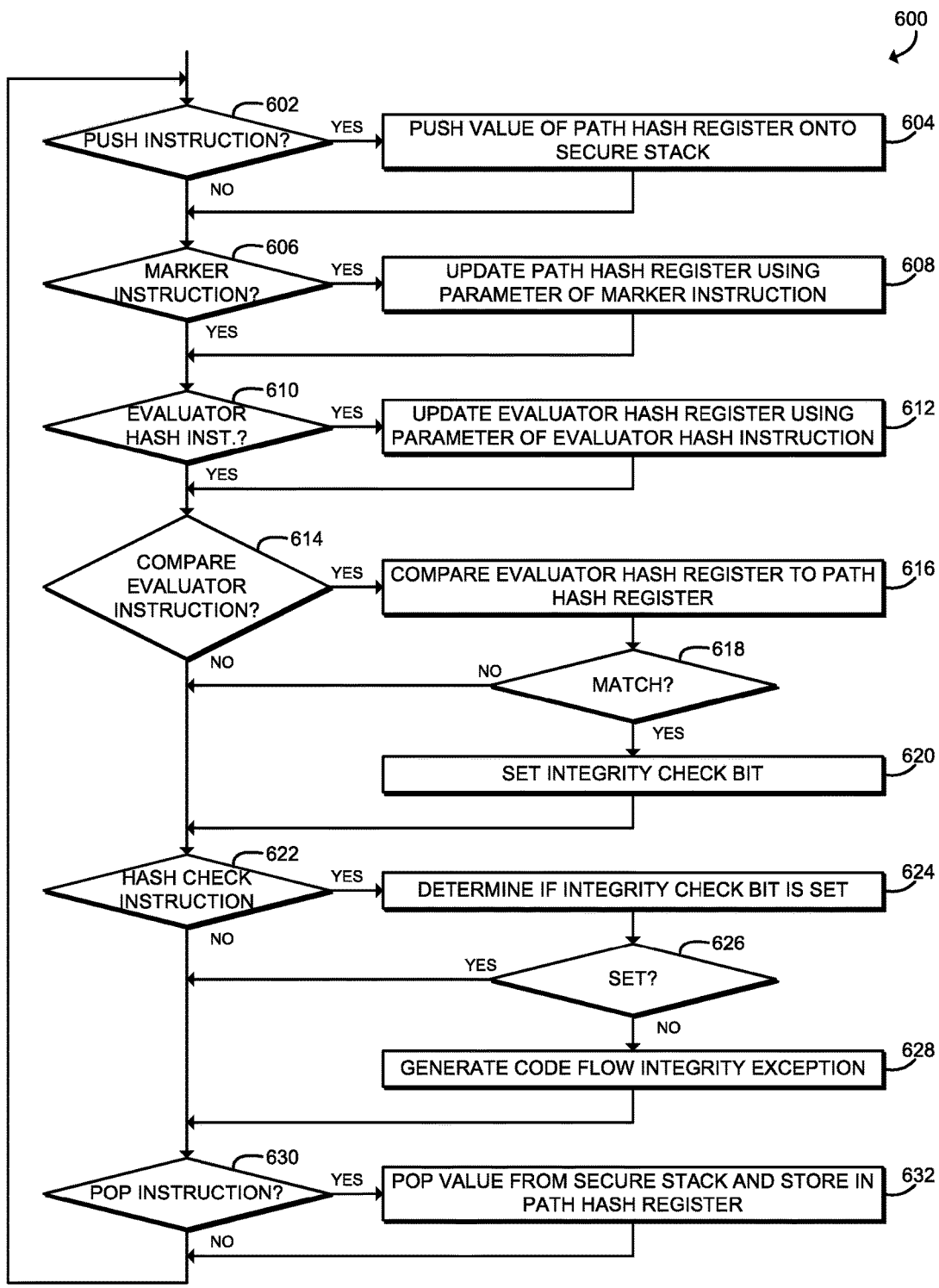
FIG. 6 is a simplified flow diagram of at least one embodiment of a method for code flow integrity protection that may be executed by a processor of a computing device of FIGS. 1-2.

Referring now to FIG. 6, in use, the target computing device 100b may execute a method 600 for code flow integrity protection. It should be appreciated that, in some embodiments, the operations of the method 600 may be performed by the processor 120 of the computing device 100 as shown in FIG. 1. The method 600 begins in block 602, in which the processor 120 determines whether a push instruction is executed. If not, the method 600 branches ahead to block 606, described below. If a push instruction is executed, the method 600 branches to block 604, in which the processor 120 pushes the value of the path hash register 224 onto a secure stack. As described above, the secure stack may be embodied as any secure memory location that is protected from unauthorized access and/or modification, such as an encrypted memory page or a register file of the processor 120. After executing the push instruction, the method 600 advances to block 606.

In block 606, the processor 120 determines whether a marker instruction is executed. If not, the method 600 branches ahead to block 610, described below. If a marker instruction is executed, the method 600 branches to block 608, in which the processor 120 updates the value of the path hash register 224 using a parameter of the marker instruction. As described above, the parameter may be embodied as, for example, an offset of the marker instruction. The parameter may be determined statically, and for example may be supplied as an immediate value to the processor 120. The processor 120 may update the path hash register 224 using a hash function that ensures that no two sets of markers result in the same hash value, but high levels of cryptographic strength may not be required. For example, the processor 120 may use a hash function based on multiplier and Galois field inverter building blocks that may perform strong mixing of the bits supplied offset values using only a small number of levels of combinatorial logic. As another example, the processor 120 may perform a small number (e.g., 1, 3, 5, or 7) of AES rounds followed by multiplication-based merging. Depending on the die area spent, such an operation could be completed in one processor clock. After executing the marker instruction, the method 600 advances to block 610.

In block 610, the processor 120 determines whether an evaluator hash instruction is executed. If not, the method 600 branches ahead to block 614, described below. If an evaluator hash instruction is executed, the method 600 branches to block 612, in which the processor 120 updates the value of the evaluator hash register 228 using a parameter of the evaluator hash instruction. As described above, the parameter may be embodied as, for example, an offset of a corresponding marker instruction. The parameter may be determined statically, and for example may be supplied as an immediate value to the processor 120. The processor 120 may update the evaluator hash register 228 using the same algorithm used by marker instructions to update the path hash register 224. After executing the evaluator hash instruction, the method 600 advances to block 614.

In block 614, the processor 120 determines whether a compare evaluator instruction is executed. If not, the method 600 branches ahead to block 622, described below. If a compare evaluator instruction is executed, the method 600 branches to block 616, in which the processor 120 compares the evaluator hash register 228 to the path hash register 224. In block 618, the processor 120 determines whether the evaluator hash register 228 matches the path hash register 224. If not, the method 600 branches ahead to block 622, described below. If the evaluator hash register 228 matches the path hash register 224, the method 600 advances to block 620, in which the processor 120 sets the integrity check bit 230. After executing the compare evaluator instruction, the method 600 advances to block 622.

In block 622, the processor 120 determines whether a hash check instruction is executed. If not, the method 600 branches ahead to block 630, described below. If a hash check instruction is executed, the method 600 branches to block 624, in which the processor 120 determines whether the integrity check bit 230 is set. In block 626, the processor 120 checks whether the integrity check bit 230 is set. If set, the method 600 branches ahead to block 630, described below. If the integrity check bit 230 is not set, the method 600 advances to block 628, in which the processor 120 generates a code flow integrity exception. After executing the hash check instruction, the method 600 advances to block 630.

In block 630, the processor 120 determines whether a pop instruction is executed. If not, the method 600 loops back to block 602 to continue processing instructions. If a pop instruction is executed, the method 600 branches to block 632, in which the processor 120 pops the top value from the secure stack and stores that value in the path hash register 224. After executing the pop instruction, the method 600 loops back to block 602 to continue processing instructions.

EXAMPLES

Illustrative examples of the technologies disclosed herein are provided below. An embodiment of the technologies may include any one or more, and any combination of, the examples described below.

Example 1 includes a computing device for control flow integrity protection, the computing device comprising: a static analyzer to (i) identify an atomic code path of a protected code, wherein the atomic code path comprises an entry point and an exit point, and (ii) identify a potential gadget in the atomic code path; and an instrumentation manager to (i) insert a first marker instruction in the atomic code path in proximity to the potential gadget with a parameter that corresponds to an address of the first marker instruction, wherein the first marker instruction, when executed, causes a processor of a target computing device to update a path hash of the target computing device as a function of the address of the first marker instruction, and (ii) insert one or more control flow integrity evaluation instructions in the protected code after the exit point of the atomic code path, wherein the control flow integrity evaluation instructions, when executed, cause the processor of the target computing device to compare the path hash to an expected hash value.

Example 2 includes the subject matter of Example 1, and wherein to insert the first marker instruction in the atomic code path in proximity to the potential gadget comprises to insert the first marker instruction in the atomic code path immediately before or immediately after the potential gadget.

Example 3 includes the subject matter of any of Examples 1 and 2, and wherein the atomic code path comprises a sequence of code without a subroutine call, a subroutine return, a loop entry, or a jump other than an if statement jump or a case statement jump.

Example 4 includes the subject matter of any of Examples 1-3, and wherein to identify the potential gadget comprises to identify a segment of the atomic code path that may be executed by a control flow exploit.

Example 5 includes the subject matter of any of Examples 1-4, and wherein the potential gadget comprises a return-oriented programming gadget or a jump-oriented programming gadget.

Example 6 includes the subject matter of any of Examples 1-5, and wherein the potential gadget comprises an external dynamic linked library call.

Example 7 includes the subject matter of any of Examples 1-6, and wherein: the static analyzer is further to statically analyze the protected code; to identify the atomic code path comprises to identify the atomic code path in response to statically analysis of the protected code; and to identify the potential gadget in the atomic code path comprises to identify the potential gadget in response to the static analysis of the protected code.

Example 8 includes the subject matter of any of Examples 1-7, and wherein to insert the one or more control flow integrity evaluation instructions comprises to: insert a first hash evaluator instruction in the protected code after the exit point of the atomic code path with a parameter that corresponds to the address of the first marker instruction; insert a first compare evaluator instruction in the protected code after the first hash evaluator instruction; and insert a hash check instruction in the protected code after the first compare evaluator instruction.

Example 9 includes the subject matter of any of Examples 1-8, and wherein: the static analyzer is further to identify a second potential gadget in the atomic code path, wherein the second potential gadget occurs after the first potential gadget in the atomic code path; the instrumentation manager is further to (i) insert a second marker instruction in the atomic code path in proximity to the second potential gadget with a parameter that corresponds to an address of the second marker instruction, and (ii) insert a second hash evaluator instruction in the protected code after the first hash evaluator instruction with a parameter that corresponds to the address of the second marker instruction; and to insert the first compare evaluator instruction further comprises to insert the first compare evaluator instruction after the second hash evaluator instruction.

Example 10 includes the subject matter of any of Examples 1-9, and wherein: the static analyzer is further to (i) identify a second atomic code path of the protected code, wherein the second atomic code path comprises an entry point and an exit point, and wherein the exit point of the atomic code path comprises the exit point of the second atomic code path, and (ii) identify a second potential gadget in the second atomic code path; the instrumentation manager is further to (i) insert a second marker instruction in the second atomic code path in proximity to the second potential gadget with a parameter that corresponds to an address of the second marker instruction, (ii) insert a second hash evaluator instruction in the protected code after the first compare evaluator instruction with a parameter that corresponds to the address of the second marker instruction, and (iii) insert a second compare evaluator instruction in the protected code after the second hash evaluator instruction; and to insert the hash check instruction further comprises to insert the hash check instruction after the second compare evaluator instruction.

Example 11 includes the subject matter of any of Examples 1-10, and wherein the instrumentation manager is further to: insert a second marker instruction in the atomic code path at the entry point of the atomic code path with a parameter that corresponds to an address of the second marker instruction; and insert a second hash evaluator instruction in the protected code after the exit point and before the first hash evaluator instruction with a parameter that corresponds to the address of the second marker instruction.

Example 12 includes the subject matter of any of Examples 1-11, and wherein: the static analyzer is further to identify a non-return jump of the protected code that jumps to the entry point of the atomic code path; and the instrumentation manager is further to (i) insert a second marker instruction in the protected code before the non-return jump with a parameter that corresponds to an address of the second marker instruction, and (ii) insert a second hash evaluator instruction in the protected code after the exit point and before the first hash evaluator instruction with a parameter that corresponds to the address of the second marker instruction.

Example 13 includes the subject matter of any of Examples 1-12, and wherein: to insert the first hash evaluator instruction comprises to insert a first hash evaluator instruction that, when executed, causes the processor to update the expected hash value of the target computing device as a function of the address of the first marker instruction; to insert the first compare evaluator instruction comprises to insert a first compare evaluator instruction that, when executed, causes the processor to determine whether the path hash matches the expected hash value; and to insert the hash check instruction comprises to insert a hash check instruction that, when executed, causes the processor to generate a code flow integrity exception in response to a determination that the path hash does not match the expected hash value.

Example 14 includes the subject matter of any of Examples 1-13, and wherein the instrumentation manager is further to: insert a push instruction in the protected code at the entry point of the atomic code path; and insert a pop instruction in the protected code after the hash check instruction.

Example 15 includes the subject matter of any of Examples 1-14, and wherein: to insert the push instruction comprises to insert a push instruction that, when executed, causes a processor of a target computing device to save a path hash of the target computing device to a secure storage location of the target computing device; and to insert the pop instruction comprises to insert a pop instruction that, when executed, causes the processor to restore the path hash from the secure storage location.

Example 16 includes a computing device for control flow integrity protection, the computing device comprising: a path hash updater to (i) execute an atomic code path of a protected code, wherein the atomic code path comprises an entry point, an exit point, and one or more marker instructions, (ii) update a path hash as a function of an address of a first marker instruction of the one or more marker instructions in response to execution of the atomic code path, and (iii) reach the exit point of the atomic code path in response to the execution of the atomic code path; a hash evaluator to (i) generate an expected hash value as a function of one or more addresses in response to reaching the exit point, wherein each of the one or more addresses corresponds to a marker instruction of the one or more marker instructions, and (ii) determine whether the path hash matches the expected hash value; and a code flow integrity checker to generate a code flow integrity exception in response to a determination that the path hash does not match the expected hash value.

Example 17 includes the subject matter of Example 16, and wherein: the computing device further comprises a processor; to update the path hash comprises to execute, by the processor, the first marker instruction of the atomic code path with a parameter that corresponds to the address of the first marker instruction; to generate the expected hash value comprises to execute, by the processor, a group of one or more hash evaluator instructions, wherein each hash evaluator instruction of the group of one or more hash evaluator instructions corresponds to a marker instruction of the one or more marker instructions; to determine whether the path hash matches the expected hash value comprises to execute, by the processor, a compare evaluator instruction; and to generate the code flow integrity exception in response to the determination that the path hash does not match the expected hash comprises to execute, by the processor, a hash check instruction.

Example 18 includes the subject matter of any of Examples 16 and 17, and wherein: to update the path hash as a function of the address of the first marker instruction comprises to update the path hash as a function of an offset of the first marker instruction in the protected code; and to generate the expected hash value as a function of the one or more addresses comprises to generate the expected hash value as a function of one or more offsets, wherein each of the one or more offsets corresponds to an offset of a marker instruction of the one or more marker instructions.

Example 19 includes the subject matter of any of Examples 16-18, and wherein the atomic code path comprises a sequence of code without a subroutine call, a subroutine return, a loop entry, or a jump other than an if statement jump or a case statement jump.

Example 20 includes the subject matter of any of Examples 16-19, and wherein: the computing device further comprises a path hash register and an evaluator hash register; to update the path hash comprises to store the path hash in the path hash register; to generate the expected hash value comprises to store the expected hash value in the evaluator hash register; and to determine whether the path hash matches the expected hash value comprises to compare the path hash register and the evaluator hash register.

Example 21 includes the subject matter of any of Examples 16-20, and wherein: the computing device further comprises an integrity check bit; and to determine whether the path hash matches the expected hash value comprises to set the integrity check bit in response to a determination that the path hash matches the expected hash.

Example 22 includes the subject matter of any of Examples 16-21, and wherein: the protected code comprises a second atomic code path that includes the exit point and a second set of one or more marker instructions; the hash evaluator is further to (i) generate a second expected hash value as a function of a second set of one or more addresses in response to reaching the exit point, wherein each of the second set of one or more addresses corresponds to a marker instruction of the second set of one or more marker instructions of the second atomic code path, and (ii) determine whether the path hash matches the second expected hash value; and to generate the code flow integrity exception comprises to generate the code flow integrity exception in response to a determination that the path hash does not match the expected hash value or the second expected hash value.

Example 23 includes the subject matter of any of Examples 16-22, and wherein: the computing device further comprises a processor; to generate the expected hash value comprises to execute, by the processor, a first group of one or more hash evaluator instructions, wherein each hash evaluator instruction of the first group corresponds to a marker instruction of the one or more marker instructions of the atomic code path; to determine whether the path hash matches the expected hash value comprises to execute, by the processor, a compare evaluator instruction; to generate the second expected hash value comprises to execute, by the processor, a second group of one or more hash evaluator instructions, wherein each hash evaluator instruction of the second group corresponds to a marker instruction of the second set of one or more marker instructions of the second atomic code path; to determine whether the path hash matches the second expected hash comprises to execute, by the processor, a second compare evaluator instruction; and to generate the code flow integrity exception comprises to execute, by the processor, a hash check instruction.

Example 24 includes the subject matter of any of Examples 16-23, and further comprising: a state manager to (i) save a previous path hash in a secure storage location of the computing device, and (ii) restore the previous path hash from the secure storage location in response to a determination that the path hash matches the expected hash value; wherein to execute the atomic code path comprises to execute the atomic code path in response to saving of the previous path hash.

Example 25 includes the subject matter of any of Examples 16-24, and wherein: the computing device further comprises a processor; to save the previous path hash comprises to execute, by the processor, a push instruction to store the previous path hash in a secure stack; and to restore the previous path hash comprises to execute, by the processor, a pop instruction to retrieve the previous path hash from the secure stack.

Example 26 includes the subject matter of any of Examples 16-25, and wherein the secure storage location comprises an encrypted memory page.

Example 27 includes the subject matter of any of Examples 16-26, and wherein the secure storage location comprises a secure register file of a processor of the computing device.

Example 28 includes the subject matter of any of Examples 16-27, and further comprising a memory manager to (i) generate a key domain selector as a function of the path hash in response to an update of the path hash and (ii) perform an encrypted memory access with the key domain selector.

Example 29 includes a method for control flow integrity protection, the method comprising: identifying, by a computing device, an atomic code path of a protected code, wherein the atomic code path comprises an entry point and an exit point; identifying, by the computing device, a potential gadget in the atomic code path; inserting, by the computing device, a first marker instruction in the atomic code path in proximity to the potential gadget with a parameter that corresponds to an address of the first marker instruction, wherein the first marker instruction, when executed, causes a processor of a target computing device to update a path hash of the target computing device as a function of the address of the first marker instruction; and inserting, by the computing device, one or more control flow integrity evaluation instructions in the protected code after the exit point of the atomic code path, wherein the control flow integrity evaluation instructions, when executed, cause the processor of the target computing device to compare the path hash to an expected hash value.

Example 30 includes the subject matter of Example 29, and wherein inserting the first marker instruction in the atomic code path in proximity to the potential gadget comprises inserting the first marker instruction in the atomic code path immediately before or immediately after the potential gadget.

Example 31 includes the subject matter of any of Examples 29 and 30, and wherein the atomic code path comprises a sequence of code without a subroutine call, a subroutine return, a loop entry, or a jump other than an if statement jump or a case statement jump.

Example 32 includes the subject matter of any of Examples 29-31, and wherein identifying the potential gadget comprises identifying a segment of the atomic code path that may be executed by a control flow exploit.

Example 33 includes the subject matter of any of Examples 29-32, and wherein the potential gadget comprises a return-oriented programming gadget or a jump-oriented programming gadget.

Example 34 includes the subject matter of any of Examples 29-33, and wherein the potential gadget comprises an external dynamic linked library call.

Example 35 includes the subject matter of any of Examples 29-34, and further comprising: statically analyzing, by the computing device, the protected code; wherein identifying the atomic code path comprises identifying the atomic code path in response to statically analyzing the protected code; and wherein identifying the potential gadget in the atomic code path comprises identifying the potential gadget in response to statically analyzing the protected code.

Example 36 includes the subject matter of any of Examples 29-35, and wherein inserting the one or more control flow integrity evaluation instructions comprises: inserting a first hash evaluator instruction in the protected code after the exit point of the atomic code path with a parameter that corresponds to the address of the first marker instruction; inserting a first compare evaluator instruction in the protected code after the first hash evaluator instruction; and inserting a hash check instruction in the protected code after the first compare evaluator instruction.

Example 37 includes the subject matter of any of Examples 29-36, and further comprising: identifying, by the computing device, a second potential gadget in the atomic code path, wherein the second potential gadget occurs after the first potential gadget in the atomic code path; inserting, by the computing device, a second marker instruction in the atomic code path in proximity to the second potential gadget with a parameter that corresponds to an address of the second marker instruction; and inserting, by the computing device, a second hash evaluator instruction in the protected code after the first hash evaluator instruction with a parameter that corresponds to the address of the second marker instruction; wherein inserting the first compare evaluator instruction further comprises inserting the first compare evaluator instruction after the second hash evaluator instruction.

Example 38 includes the subject matter of any of Examples 29-36, and further comprising: identifying, by the computing device, a second atomic code path of the protected code, wherein the second atomic code path comprises an entry point and an exit point, and wherein the exit point of the atomic code path comprises the exit point of the second atomic code path; identifying, by the computing device, a second potential gadget in the second atomic code path; inserting, by the computing device, a second marker instruction in the second atomic code path in proximity to the second potential gadget with a parameter that corresponds to an address of the second marker instruction; inserting, by the computing device, a second hash evaluator instruction in the protected code after the first compare evaluator instruction with a parameter that corresponds to the address of the second marker instruction; and inserting, by the computing device, a second compare evaluator instruction in the protected code after the second hash evaluator instruction; wherein inserting the hash check instruction further comprises inserting the hash check instruction after the second compare evaluator instruction.

Example 39 includes the subject matter of any of Examples 29-37, and further comprising: inserting, by the computing device, a second marker instruction in the atomic code path at the entry point of the atomic code path with a parameter that corresponds to an address of the second marker instruction; and inserting, by the computing device, a second hash evaluator instruction in the protected code after the exit point and before the first hash evaluator instruction with a parameter that corresponds to the address of the second marker instruction.

Example 40 includes the subject matter of any of Examples 29-39, and further comprising: identifying, by the computing device, a non-return jump of the protected code that jumps to the entry point of the atomic code path; inserting, by the computing device, a second marker instruction in the protected code before the non-return jump with a parameter that corresponds to an address of the second marker instruction; and inserting, by the computing device, a second hash evaluator instruction in the protected code after the exit point and before the first hash evaluator instruction with a parameter that corresponds to the address of the second marker instruction.

Example 41 includes the subject matter of any of Examples 29-40, and wherein: inserting the first hash evaluator instruction comprises inserting a first hash evaluator instruction that, when executed, causes the processor to update the expected hash value of the target computing device as a function of the address of the first marker instruction; inserting the first compare evaluator instruction comprises inserting a first compare evaluator instruction that, when executed, causes the processor to determine whether the path hash matches the expected hash value; and inserting the hash check instruction comprises inserting a hash check instruction that, when executed, causes the processor to generate a code flow integrity exception in response to a determination that the path hash does not match the expected hash value.

Example 42 includes the subject matter of any of Examples 29-41, and further comprising: inserting, by the computing device, a push instruction in the protected code at the entry point of the atomic code path; and inserting, by the computing device, a pop instruction in the protected code after the hash check instruction.

Example 43 includes the subject matter of any of Examples 29-42, and wherein: inserting the push instruction comprises inserting a push instruction that, when executed, causes a processor of a target computing device to save a path hash of the target computing device to a secure storage location of the target computing device; and inserting the pop instruction comprises inserting a pop instruction that, when executed, causes the processor to restore the path hash from the secure storage location.

Example 44 includes a method for control flow integrity protection, the method comprising: executing, by a computing device, an atomic code path of a protected code, wherein the atomic code path comprises an entry point, an exit point, and one or more marker instructions; updating, by the computing device, a path hash as a function of an address of a first marker instruction of the one or more marker instructions in response to executing the atomic code path; reaching, by the computing device, the exit point of the atomic code path in response to executing the atomic code path; generating, by the computing device, an expected hash value as a function of one or more addresses in response to reaching the exit point, wherein each of the one or more addresses corresponds to a marker instruction of the one or more marker instructions; determining, by the computing device, whether the path hash matches the expected hash value; and generating, by the computing device, a code flow integrity exception in response to determining that the path hash does not match the expected hash value.

Example 45 includes the subject matter of Example 44, and wherein: updating the path hash comprises executing, by a processor of the computing device, the first marker instruction of the atomic code path with a parameter that corresponds to the address of the first marker instruction; generating the expected hash value comprises executing, by the processor, a group of one or more hash evaluator instructions, wherein each hash evaluator instruction of the group of one or more hash evaluator instructions corresponds to a marker instruction of the one or more marker instructions; determining whether the path hash matches the expected hash value comprises executing, by the processor, a compare evaluator instruction; and generating the code flow integrity exception in response to determining that the path hash does not match the expected hash comprises executing, by the processor, a hash check instruction.

Example 46 includes the subject matter of any of Examples 44 and 45, and wherein: updating the path hash as a function of the address of the first marker instruction comprises updating the path hash as a function of an offset of the first marker instruction in the protected code; and generating the expected hash value as a function of the one or more addresses comprises generating the expected hash value as a function of one or more offsets, wherein each of the one or more offsets corresponds to an offset of a marker instruction of the one or more marker instructions.

Example 47 includes the subject matter of any of Examples 44-46, and wherein the atomic code path comprises a sequence of code without a subroutine call, a subroutine return, a loop entry, or a jump other than an if statement jump or a case statement jump.

Example 48 includes the subject matter of any of Examples 44-47, and wherein: updating the path hash comprises storing the path hash in a path hash register of the computing device; generating the expected hash value comprises storing the expected hash value in an evaluator hash register of the computing device; and determining whether the path hash matches the expected hash value comprises comparing the path hash register and the evaluator hash register.

Example 49 includes the subject matter of any of Examples 44-48, and wherein determining whether the path hash matches the expected hash value comprises setting an integrity check bit of the computing device in response to determining that the path hash matches the expected hash.

Example 50 includes the subject matter of any of Examples 44-49, and wherein the protected code includes a second atomic code path that includes the exit point and a second set of one or more marker instructions, the method further comprising: generating, by the computing device, a second expected hash value as a function of a second set of one or more addresses in response to reaching the exit point, wherein each of the second set of one or more addresses corresponds to a marker instruction of the second set of one or more marker instructions of the second atomic code path; and determining, by the computing device, whether the path hash matches the second expected hash value; wherein generating the code flow integrity exception comprises generating the code flow integrity exception in response to determining that the path hash does not match the expected hash value or the second expected hash value.

Example 51 includes the subject matter of any of Examples 44-50, and wherein: generating the expected hash value comprises executing, by a processor of the computing device, a first group of one or more hash evaluator instructions, wherein each hash evaluator instruction of the first group corresponds to a marker instruction of the one or more marker instructions of the atomic code path; determining whether the path hash matches the expected hash value comprises executing, by the processor, a compare evaluator instruction; generating the second expected hash value comprises executing, by the processor, a second group of one or more hash evaluator instructions, wherein each hash evaluator instruction of the second group corresponds to a marker instruction of the second set of one or more marker instructions of the second atomic code path; determining whether the path hash matches the second expected hash comprises executing, by the processor, a second compare evaluator instruction; and generating the code flow integrity exception comprises executing, by the processor, a hash check instruction.

Example 52 includes the subject matter of any of Examples 44-51, and further comprising: saving, by the computing device, a previous path hash in a secure storage location of the computing device; and restoring, by the computing device, the previous path hash from the secure storage location in response to determining that the path hash matches the expected hash value; wherein executing the atomic code path comprises executing the atomic code path in response to saving the previous path hash.

Example 53 includes the subject matter of any of Examples 44-52, and wherein: saving the previous path hash comprises executing, by a processor of the computing device, a push instruction to store the previous path hash in a secure stack; and restoring the previous path hash comprises executing, by the processor, a pop instruction to retrieve the previous path hash from the secure stack.

Example 54 includes the subject matter of any of Examples 44-53, and wherein the secure storage location comprises an encrypted memory page.

Example 55 includes the subject matter of any of Examples 44-54, and wherein the secure storage location comprises a secure register file of a processor of the computing device.

Example 56 includes the subject matter of any of Examples 44-55, and further comprising: generating, by the computing device, a key domain select as a function of the path hash in response to updating the path hash; and performing, by the computing device, an encrypted memory access using the key domain selector.

Example 57 includes a computing device comprising: a processor; and a memory having stored therein a plurality of instructions that when executed by the processor cause the computing device to perform the method of any of Examples 29-56.

Example 58 includes one or more machine readable storage media comprising a plurality of instructions stored thereon that in response to being executed result in a computing device performing the method of any of Examples 29-56.

Example 59 includes a computing device comprising means for performing the method of any of Examples 29-56.

Example 60 includes a computing device for control flow integrity protection, the computing device comprising: means for identifying an atomic code path of a protected code, wherein the atomic code path comprises an entry point and an exit point; means for identifying a potential gadget in the atomic code path; means for inserting a first marker instruction in the atomic code path in proximity to the potential gadget with a parameter that corresponds to an address of the first marker instruction, wherein the first marker instruction, when executed, causes a processor of a target computing device to update a path hash of the target computing device as a function of the address of the first marker instruction; and means for inserting one or more control flow integrity evaluation instructions in the protected code after the exit point of the atomic code path, wherein the control flow integrity evaluation instructions, when executed, cause the processor of the target computing device to compare the path hash to an expected hash value.

Example 61 includes the subject matter of Example 60, and wherein the means for inserting the first marker instruction in the atomic code path in proximity to the potential gadget comprises means for inserting the first marker instruction in the atomic code path immediately before or immediately after the potential gadget.

Example 62 includes the subject matter of any of Examples 60 and 61, and wherein the atomic code path comprises a sequence of code without a subroutine call, a subroutine return, a loop entry, or a jump other than an if statement jump or a case statement jump.

Example 63 includes the subject matter of any of Examples 60-62, and wherein the means for identifying the potential gadget comprises means for identifying a segment of the atomic code path that may be executed by a control flow exploit.

Example 64 includes the subject matter of any of Examples 60-63, and wherein the potential gadget comprises a return-oriented programming gadget or a jump-oriented programming gadget.

Example 65 includes the subject matter of any of Examples 60-64, and wherein the potential gadget comprises an external dynamic linked library call.

Example 66 includes the subject matter of any of Examples 60-65, and further comprising: means for statically analyzing the protected code; wherein the means for identifying the atomic code path comprises means for identifying the atomic code path in response to statically analyzing the protected code; and wherein the means for identifying the potential gadget in the atomic code path comprises means for identifying the potential gadget in response to statically analyzing the protected code.

Example 67 includes the subject matter of any of Examples 60-66, and wherein the means for inserting the one or more control flow integrity evaluation instructions comprises: means for inserting a first hash evaluator instruction in the protected code after the exit point of the atomic code path with a parameter that corresponds to the address of the first marker instruction; means for inserting a first compare evaluator instruction in the protected code after the first hash evaluator instruction; and means for inserting a hash check instruction in the protected code after the first compare evaluator instruction.

Example 68 includes the subject matter of any of Examples 60-67, and further comprising: means for identifying a second potential gadget in the atomic code path, wherein the second potential gadget occurs after the first potential gadget in the atomic code path; means for inserting a second marker instruction in the atomic code path in proximity to the second potential gadget with a parameter that corresponds to an address of the second marker instruction; and means for inserting a second hash evaluator instruction in the protected code after the first hash evaluator instruction with a parameter that corresponds to the address of the second marker instruction; wherein the means for inserting the first compare evaluator instruction further comprises means for inserting the first compare evaluator instruction after the second hash evaluator instruction.

Example 69 includes the subject matter of any of Examples 60-68, and further comprising: means for identifying a second atomic code path of the protected code, wherein the second atomic code path comprises an entry point and an exit point, and wherein the exit point of the atomic code path comprises the exit point of the second atomic code path; means for identifying a second potential gadget in the second atomic code path; means for inserting a second marker instruction in the second atomic code path in proximity to the second potential gadget with a parameter that corresponds to an address of the second marker instruction; means for inserting a second hash evaluator instruction in the protected code after the first compare evaluator instruction with a parameter that corresponds to the address of the second marker instruction; and means for inserting a second compare evaluator instruction in the protected code after the second hash evaluator instruction; wherein the means for inserting the hash check instruction further comprises means for inserting the hash check instruction after the second compare evaluator instruction.

Example 70 includes the subject matter of any of Examples 60-69, and further comprising: means for inserting a second marker instruction in the atomic code path at the entry point of the atomic code path with a parameter that corresponds to an address of the second marker instruction; and means for inserting a second hash evaluator instruction in the protected code after the exit point and before the first hash evaluator instruction with a parameter that corresponds to the address of the second marker instruction.

Example 71 includes the subject matter of any of Examples 60-70, and further comprising: means for identifying a non-return jump of the protected code that jumps to the entry point of the atomic code path; means for inserting a second marker instruction in the protected code before the non-return jump with a parameter that corresponds to an address of the second marker instruction; and means for inserting a second hash evaluator instruction in the protected code after the exit point and before the first hash evaluator instruction with a parameter that corresponds to the address of the second marker instruction.

Example 72 includes the subject matter of any of Examples 60-71, and wherein: the means for inserting the first hash evaluator instruction comprises means for inserting a first hash evaluator instruction that, when executed, causes the processor to update the expected hash value of the target computing device as a function of the address of the first marker instruction; the means for inserting the first compare evaluator instruction comprises means for inserting a first compare evaluator instruction that, when executed, causes the processor to determine whether the path hash matches the expected hash value; and the means for inserting the hash check instruction comprises means for inserting a hash check instruction that, when executed, causes the processor to generate a code flow integrity exception in response to a determination that the path hash does not match the expected hash value.

Example 73 includes the subject matter of any of Examples 60-72, and further comprising: means for inserting a push instruction in the protected code at the entry point of the atomic code path; and means for inserting a pop instruction in the protected code after the hash check instruction.

Example 74 includes the subject matter of any of Examples 60-73, and wherein: the means for inserting the push instruction comprises means for inserting a push instruction that, when executed, causes a processor of a target computing device to save a path hash of the target computing device to a secure storage location of the target computing device; and the means for inserting the pop instruction comprises means for inserting a pop instruction that, when executed, causes the processor to restore the path hash from the secure storage location.

Example 75 includes a computing device for control flow integrity protection, the computing device comprising: means for executing an atomic code path of a protected code, wherein the atomic code path comprises an entry point, an exit point, and one or more marker instructions; means for updating a path hash as a function of an address of a first marker instruction of the one or more marker instructions in response to executing the atomic code path; means for reaching the exit point of the atomic code path in response to executing the atomic code path; means for generating an expected hash value as a function of one or more addresses in response to reaching the exit point, wherein each of the one or more addresses corresponds to a marker instruction of the one or more marker instructions; means for determining whether the path hash matches the expected hash value; and means for generating a code flow integrity exception in response to determining that the path hash does not match the expected hash value.

Example 76 includes the subject matter of Example 75, and wherein: the means for updating the path hash comprises means for executing, by a processor of the computing device, the first marker instruction of the atomic code path with a parameter that corresponds to the address of the first marker instruction; the means for generating the expected hash value comprises means for executing, by the processor, a group of one or more hash evaluator instructions, wherein each hash evaluator instruction of the group of one or more hash evaluator instructions corresponds to a marker instruction of the one or more marker instructions; the means for determining whether the path hash matches the expected hash value comprises means for executing, by the processor, a compare evaluator instruction; and the means for generating the code flow integrity exception in response to determining that the path hash does not match the expected hash comprises means for executing, by the processor, a hash check instruction.

Example 77 includes the subject matter of any of Examples 75 and 76, and wherein: the means for updating the path hash as a function of the address of the first marker instruction comprises means for updating the path hash as a function of an offset of the first marker instruction in the protected code; and the means for generating the expected hash value as a function of the one or more addresses comprises means for generating the expected hash value as a function of one or more offsets, wherein each of the one or more offsets corresponds to an offset of a marker instruction of the one or more marker instructions.

Example 78 includes the subject matter of any of Examples 75-77, and wherein the atomic code path comprises a sequence of code without a subroutine call, a subroutine return, a loop entry, or a jump other than an if statement jump or a case statement jump.

Example 79 includes the subject matter of any of Examples 75-78, and wherein: the means for updating the path hash comprises means for storing the path hash in a path hash register of the computing device; the means for generating the expected hash value comprises means for storing the expected hash value in an evaluator hash register of the computing device; and the means for determining whether the path hash matches the expected hash value comprises means for comparing the path hash register and the evaluator hash register.

Example 80 includes the subject matter of any of Examples 75-79, and wherein the means for determining whether the path hash matches the expected hash value comprises means for setting an integrity check bit of the computing device in response to determining that the path hash matches the expected hash.

Example 81 includes the subject matter of any of Examples 75-80, and wherein the protected code includes a second atomic code path that includes the exit point and a second set of one or more marker instructions, the computing device further comprising: means for generating a second expected hash value as a function of a second set of one or more addresses in response to reaching the exit point, wherein each of the second set of one or more addresses corresponds to a marker instruction of the second set of one or more marker instructions of the second atomic code path; and means for determining whether the path hash matches the second expected hash value; wherein the means for generating the code flow integrity exception comprises means for generating the code flow integrity exception in response to determining that the path hash does not match the expected hash value or the second expected hash value.

Example 82 includes the subject matter of any of Examples 75-81, and wherein: the means for generating the expected hash value comprises means for executing, by a processor of the computing device, a first group of one or more hash evaluator instructions, wherein each hash evaluator instruction of the first group corresponds to a marker instruction of the one or more marker instructions of the atomic code path; the means for determining whether the path hash matches the expected hash value comprises means for executing, by the processor, a compare evaluator instruction; the means for generating the second expected hash value comprises means for executing, by the processor, a second group of one or more hash evaluator instructions, wherein each hash evaluator instruction of the second group corresponds to a marker instruction of the second set of one or more marker instructions of the second atomic code path; the means for determining whether the path hash matches the second expected hash comprises means for executing, by the processor, a second compare evaluator instruction; and the means for generating the code flow integrity exception comprises means for executing, by the processor, a hash check instruction.

Example 83 includes the subject matter of any of Examples 75-82, and further comprising: means for saving a previous path hash in a secure storage location of the computing device; and means for restoring the previous path hash from the secure storage location in response to determining that the path hash matches the expected hash value; wherein the means for executing the atomic code path comprises means for executing the atomic code path in response to saving the previous path hash.

Example 84 includes the subject matter of any of Examples 75-83, and wherein: the means for saving the previous path hash comprises means for executing, by a processor of the computing device, a push instruction to store the previous path hash in a secure stack; and the means for restoring the previous path hash comprises means for executing, by the processor, a pop instruction to retrieve the previous path hash from the secure stack.

Example 85 includes the subject matter of any of Examples 75-84, and wherein the secure storage location comprises an encrypted memory page.

Example 86 includes the subject matter of any of Examples 75-85, and wherein the secure storage location comprises a secure register file of a processor of the computing device.

Example 87 includes the subject matter of any of Examples 75-86, and further comprising: means for generating a key domain select as a function of the path hash in response to updating the path hash; and means for performing an encrypted memory access using the key domain selector.

The invention claimed is:

1. A computing device for control flow integrity protection, the computing device comprising:
  a static analyzer to (i) identify an atomic code path of a protected code, wherein the atomic code path comprises an entry point and an exit point, and (ii) identify a potential gadget in the atomic code path; and
  an instrumentation manager to (i) insert a first marker instruction in the atomic code path in proximity to the potential gadget with a parameter that corresponds to an address of the first marker instruction, wherein the first marker instruction, when executed, causes a processor of a target computing device to update a path hash of the target computing device as a function of the address of the first marker instruction, and (ii) insert one or more control flow integrity evaluation instructions in the protected code after the exit point of the atomic code path, wherein the control flow integrity evaluation instructions, when executed, cause the processor of the target computing device to compare the path hash to an expected hash value.

2. The computing device of claim 1, wherein the atomic code path comprises a sequence of code without a subroutine call, a subroutine return, a loop entry, or a jump other than an if statement jump or a case statement jump.

3. The computing device of claim 1, wherein to insert the one or more control flow integrity evaluation instructions comprises to:
  insert a first hash evaluator instruction in the protected code after the exit point of the atomic code path with a parameter that corresponds to the address of the first marker instruction;
  insert a first compare evaluator instruction in the protected code after the first hash evaluator instruction; and
  insert a hash check instruction in the protected code after the first compare evaluator instruction.

4. The computing device of claim 3, wherein:
  the static analyzer is further to identify a second potential gadget in the atomic code path, wherein the second potential gadget occurs after the first potential gadget in the atomic code path;

the instrumentation manager is further to (i) insert a second marker instruction in the atomic code path in proximity to the second potential gadget with a parameter that corresponds to an address of the second marker instruction, and (ii) insert a second hash evaluator instruction in the protected code after the first hash evaluator instruction with a parameter that corresponds to the address of the second marker instruction; and
  to insert the first compare evaluator instruction further comprises to insert the first compare evaluator instruction after the second hash evaluator instruction.

5. The computing device of claim 3, wherein:
  the static analyzer is further to (i) identify a second atomic code path of the protected code, wherein the second atomic code path comprises an entry point and an exit point, and wherein the exit point of the atomic code path comprises the exit point of the second atomic code path, and (ii) identify a second potential gadget in the second atomic code path;
  the instrumentation manager is further to (i) insert a second marker instruction in the second atomic code path in proximity to the second potential gadget with a parameter that corresponds to an address of the second marker instruction, (ii) insert a second hash evaluator instruction in the protected code after the first compare evaluator instruction with a parameter that corresponds to the address of the second marker instruction, and (iii) insert a second compare evaluator instruction in the protected code after the second hash evaluator instruction; and
  to insert the hash check instruction further comprises to insert the hash check instruction after the second compare evaluator instruction.

6. The computing device of claim 3, wherein the instrumentation manager is further to:
  insert a second marker instruction in the atomic code path at the entry point of the atomic code path with a parameter that corresponds to an address of the second marker instruction; and
  insert a second hash evaluator instruction in the protected code after the exit point and before the first hash evaluator instruction with a parameter that corresponds to the address of the second marker instruction.

7. The computing device of claim 3, wherein:
  the static analyzer is further to identify a non-return jump of the protected code that jumps to the entry point of the atomic code path; and
  the instrumentation manager is further to (i) insert a second marker instruction in the protected code before the non-return jump with a parameter that corresponds to an address of the second marker instruction, and (ii) insert a second hash evaluator instruction in the protected code after the exit point and before the first hash evaluator instruction with a parameter that corresponds to the address of the second marker instruction.

8. One or more non-transitory, computer-readable storage media comprising a plurality of instructions that in response to being executed cause a computing device to:
  identify an atomic code path of a protected code, wherein the atomic code path comprises an entry point and an exit point;
  identify a potential gadget in the atomic code path;
  insert a first marker instruction in the atomic code path in proximity to the potential gadget with a parameter that corresponds to an address of the first marker instruction, wherein the first marker instruction, when executed, causes a processor of a target computing device to update a path hash of the target computing device as a function of the address of the first marker instruction; and insert one or more control flow integrity evaluation instructions in the protected code after the exit point of the atomic code path, wherein the control flow integrity evaluation instructions, when executed, cause the processor of the target computing device to compare the path hash to an expected hash value.

9. The one or more non-transitory, computer-readable storage media of claim 8, wherein the atomic code path comprises a sequence of code without a subroutine call, a subroutine return, a loop entry, or a jump other than an if statement jump or a case statement jump.

10. The one or more non-transitory, computer-readable storage media of claim 8, wherein to insert the one or more control flow integrity evaluation instructions comprises to:

insert a first hash evaluator instruction in the protected code after the exit point of the atomic code path with a parameter that corresponds to the address of the first marker instruction;

insert a first compare evaluator instruction in the protected code after the first hash evaluator instruction; and insert a hash check instruction in the protected code after the first compare evaluator instruction.

11. The one or more non-transitory, computer-readable storage media of claim 10, further comprising a plurality of instructions that in response to being executed cause the computing device to:

identify a second potential gadget in the atomic code path, wherein the second potential gadget occurs after the first potential gadget in the atomic code path;

insert a second marker instruction in the atomic code path in proximity to the second potential gadget with a parameter that corresponds to an address of the second marker instruction; and insert a second hash evaluator instruction in the protected code after the first hash evaluator instruction with a parameter that corresponds to the address of the second marker instruction;

wherein to insert the first compare evaluator instruction further comprises to insert the first compare evaluator instruction after the second hash evaluator instruction.

12. A computing device for control flow integrity protection, the computing device comprising:

a path hash updater to (i) execute an atomic code path of a protected code, wherein the atomic code path comprises an entry point, an exit point, and one or more marker instructions, (ii) update a path hash as a function of an address of a first marker instruction of the one or more marker instructions in response to execution of the atomic code path, and (iii) reach the exit point of the atomic code path in response to the execution of the atomic code path;

a hash evaluator to (i) generate an expected hash value as a function of one or more addresses in response to reaching the exit point, wherein each of the one or more addresses corresponds to a marker instruction of the one or more marker instructions, and (ii) determine whether the path hash matches the expected bash value; and a code flow integrity checker to generate a code flow integrity exception in response to a determination that the path hash does not match the expected hash value.

13. The computing device of claim 12, wherein:
the computing device further comprises a processor;

to update the path hash comprises to execute, by the processor, the first marker instruction of the atomic code path with a parameter that corresponds to the address of the first marker instruction;

to generate the expected hash value comprises to execute, by the processor, a group of one or more hash evaluator instructions, wherein each hash evaluator instruction of the group of one or more hash evaluator instructions corresponds to a marker instruction of the one or more marker instructions;

to determine whether the path hash matches the expected hash value comprises to execute, by the processor, a compare evaluator instruction; and to generate the code flow integrity exception in response to the determination that the path hash does not match the expected hash comprises to execute, by the processor, a hash check instruction.

14. The computing device of claim 13, wherein:

to update the path hash as a function of the address of the first marker instruction comprises to update the path hash as a function of an offset of the first marker instruction in the protected code; and to generate the expected hash value as a function of the one or more addresses comprises to generate the expected hash value as a function of one or more offsets, wherein each of the one or more offsets corresponds to an offset of a marker instruction of the one or more marker instructions.

15. The computing device of claim 12, wherein:

the computing device further comprises a path hash register and an evaluator hash register;

to update the path hash comprises to store the path hash in the path hash register;

to generate the expected hash value comprises to store the expected hash value in the evaluator hash register; and to determine whether the path hash matches the expected hash value comprises to compare the path hash register and the evaluator hash register.

16. The computing device of claim 12, wherein:

the computing device further comprises an integrity check bit; and to determine whether the path hash matches the expected hash value comprises to set the integrity check bit in response to a determination that the path hash matches the expected hash.

17. The computing device of claim 12, wherein:

the protected code comprises a second atomic code path that includes the exit point and a second set of one or more marker instructions;

the hash evaluator is further to (i) generate a second expected hash value as a function of a second set of one or more addresses in response to reaching the exit point, wherein each of the second set of one or more addresses corresponds to a marker instruction of the second set of one or more marker instructions of the second atomic code path, and (ii) determine whether the path hash matches the second expected hash value; and to generate the code flow integrity exception comprises to generate the code flow integrity exception in response to a determination that the path hash does not match the expected hash value or the second expected hash value.

18. The computing device of claim 17, wherein:
the computing device further comprises a processor;

to generate the expected hash value comprises to execute, by the processor, a first group of one or more hash evaluator instructions, wherein each hash evaluator instruction of the first group corresponds to a marker instruction of the one or more marker instructions of the atomic code path;

to determine whether the path hash matches the expected hash value comprises to execute, by the processor, a compare evaluator instruction;

to generate the second expected hash value comprises to execute, by the processor, a second group of one or more hash evaluator instructions, wherein each hash evaluator instruction of the second group corresponds to a marker instruction of the second set of one or more marker instructions of the second atomic code path;

to determine whether the path hash matches the second expected hash comprises to execute, by the processor, a second compare evaluator instruction; and to generate the code flow integrity exception comprises to execute, by the processor, a hash check instruction.

19. The computing device of claim 12, further comprising:
a state manager to (i) save a previous path hash in a secure storage location of the computing device, and (ii) restore the previous path hash from the secure storage location in response to a determination that the path hash matches the expected hash value;
wherein to execute the atomic code path comprises to execute the atomic code path in response to saving of the previous path hash.

20. The computing device of claim 12, further comprising a memory manager to (i) generate a key domain selector as a function of the path hash in response to an update of the path hash and (ii) perform an encrypted memory access with the key domain selector.

21. One or more non-transitory, computer-readable storage media comprising a plurality of instructions that in response to being executed cause a computing device to:
execute an atomic code path of a protected code, wherein the atomic code path comprises an entry point, an exit point, and one or more marker instructions;
update a path hash as a function of an address of a first marker instruction of the one or more marker instructions in response to executing the atomic code path;
reach the exit point of the atomic code path in response to executing the atomic code path;
generate an expected hash value as a function of one or more addresses in response to reaching the exit point, wherein each of the one or more addresses corresponds to a marker instruction of the one or more marker instructions;
determine whether the path hash matches the expected hash value; and
generate a code flow integrity exception in response to determining that the path hash does not match the expected hash value.

22. The one or more non-transitory, computer-readable storage media of claim 21, wherein:
to update the path hash comprises to execute, by a processor of the computing device, the first marker instruction of the atomic code path with a parameter that corresponds to the address of the first marker instruction;
to generate the expected hash value comprises to execute, by the processor, a group of one or more hash evaluator instructions, wherein each hash evaluator instruction of the group of one or more hash evaluator instructions corresponds to a marker instruction of the one or more marker instructions;
to determine whether the path hash matches the expected bash value comprises to execute, by the processor, a compare evaluator instruction; and
to generate the code flow integrity exception in response to determining that the path hash does not match the expected hash comprises to execute, by the processor, a hash check instruction.

23. The one or more non-transitory, computer-readable storage media of claim 21, wherein:
to update the path hash comprises to store the path hash in a path hash register of the computing device;
to generate the expected hash value comprises to store the expected hash value in an evaluator hash register of the computing device; and
to determine whether the path hash matches the expected hash value comprises to compare the path hash register and the evaluator hash register.

24. The one or more non-transitory, computer-readable storage media of claim 21, wherein to determine whether the path hash matches the expected hash value comprises to set an integrity check bit of the computing device in response to determining that the path hash matches the expected hash.

25. The one or more non-transitory, computer-readable storage media of claim 21, further comprising a plurality of instructions that in response to being executed cause the computing device to:
generate a key domain select as a function of the path hash in response to updating the path hash; and
perform an encrypted memory access using the key domain selector.

* * * * *